(12) United States Patent
Hansson et al.

(10) Patent No.: US 9,953,076 B2
(45) Date of Patent: Apr. 24, 2018

(54) PREDICTIVE QUERY COMPLETION AND PREDICTIVE SEARCH RESULTS

(71) Applicant: Google LLC, Mountain View, CA (US)

(72) Inventors: Othar Hansson, Sunnyvale, CA (US); David Black, Mountain View, CA (US); Jon M. Wiley, Mountain View, CA (US); Manas Tungare, Mountain View, CA (US); Ziga Mahkovec, San Francisco, CA (US); Benjamin J. McMahan, San Jose, CA (US); Benedict A. Gomes, Palo Alto, CA (US); Jonathan J. Effrat, Mountain View, CA (US); Johanna R. Wright, Mountain View, CA (US); Marcin K. Wichary, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/210,535

(22) Filed: Jul. 14, 2016

(65) Prior Publication Data
US 2016/0321270 A1    Nov. 3, 2016

Related U.S. Application Data

(63) Continuation of application No. 14/195,116, filed on Mar. 3, 2014, which is a continuation of application
(Continued)

(51) Int. Cl.
*G06F 17/30* (2006.01)
*G06Q 30/02* (2012.01)

(52) U.S. Cl.
CPC ...... *G06F 17/3064* (2013.01); *G06F 17/3097* (2013.01); *G06F 17/30696* (2013.01); *G06F 17/30867* (2013.01); *G06Q 30/0275* (2013.01)

(58) Field of Classification Search
CPC .......... G06F 17/30867; G06F 17/3064; G06F 17/3097; G06F 17/3053; G06F 17/30651;
(Continued)

(56) References Cited

U.S. PATENT DOCUMENTS 6,006,225 A    12/1999    Bowman et al.
6,009,459 A    12/1999    Belfiore et al.
(Continued)

FOREIGN PATENT DOCUMENTS

WO    2009085664    7/2009

OTHER PUBLICATIONS

'Closure Library (Labs).' Event Handling—Closure Library—Google Code [online]. 2011 [retrieved on Aug. 16, 2011]. Retrieved from the Internet electronic mail: http://code.google.com/closure/library/doc/events_tutorial.html, 4 pages.
(Continued)

*Primary Examiner* — Augustine Obisesan
(74) *Attorney, Agent, or Firm* — Fish & Richardson P.C.

(57) ABSTRACT

Methods, systems, and apparatus, including computer program products, for processing search query suggestions. In one aspect, a search service provides query suggestions responsive to a query suggestion request from a client device, and determines if a prediction criterion is met. The prediction criterion is independent of a user selection of a query suggestion provided in response to one or more query suggestion requests. In response to determining that the prediction criterion is met, the search system provides search results to the client device. The search results are responsive to one of the query suggestions provided in response to the query suggestion request or one or more previous query suggestion requests.

7 Claims, 15 Drawing Sheets

Related U.S. Application Data

No. 13/213,904, filed on Aug. 19, 2011, now Pat. No. 8,706,750.

(60) Provisional application No. 61/375,222, filed on Aug. 19, 2010.

(58) Field of Classification Search
CPC ......... G06F 17/30448; G06F 17/30442; G06F 17/30395; G06F 3/0482; G06F 17/30672; G06Q 30/0256; G06Q 30/0244
See application file for complete search history.

(56) References Cited

U.S. PATENT DOCUMENTS

| | | |
|---|---|---|
| 6,370,518 B1 | 4/2002 | Payne |
| 6,377,965 B1 | 4/2002 | Hachamovitch et al. |
| 6,411,950 B1 | 6/2002 | Moricz et al. |
| 6,578,022 B1 | 6/2003 | Foulger |
| 6,751,606 B1 | 6/2004 | Fries et al. |
| 6,779,060 B1 | 8/2004 | Azvine |
| 6,895,558 B1 | 5/2005 | Loveland |
| 6,948,129 B1 | 9/2005 | Loghmani |
| 7,103,470 B2 | 9/2006 | Mintz |
| 7,483,880 B2 | 1/2009 | Rossi et al. |
| 7,487,185 B2 | 2/2009 | Lomelin-Stoupignan et al. |
| 7,499,940 B1 | 3/2009 | Gibbs |
| 7,672,932 B2 | 3/2010 | Hood et al. |
| 7,725,485 B1 | 5/2010 | Sahami et al. |
| 7,752,326 B2 | 7/2010 | Smit |
| 7,836,044 B2 | 11/2010 | Kamvar et al. |
| 7,890,499 B1 | 2/2011 | Boswell |
| 8,005,919 B2 | 8/2011 | Mehanna |
| 8,060,639 B2 | 11/2011 | Smit et al. |
| 8,112,529 B2 | 2/2012 | Van den Oord et al. |
| 8,156,109 B2 | 4/2012 | Kamvar et al. |
| 2002/0178008 A1 | 11/2002 | Reynar |
| 2003/0212666 A1 | 11/2003 | Basu et al. |
| 2004/0186827 A1 | 9/2004 | Anick et al. |
| 2004/0199498 A1 | 10/2004 | Kapur et al. |
| 2005/0055337 A1 | 3/2005 | Bebo et al. |
| 2005/0184973 A1 | 8/2005 | Lum et al. |
| 2006/0161520 A1 | 7/2006 | Brewer et al. |
| 2006/0190436 A1* | 8/2006 | Richardson ......... G06F 17/3064 |
| 2006/0206454 A1 | 9/2006 | Forstall et al. |
| 2006/0259479 A1 | 11/2006 | Dai |
| 2006/0271429 A1 | 11/2006 | Borgs et al. |
| 2007/0011179 A1 | 1/2007 | Paval |
| 2007/0050339 A1 | 3/2007 | Kasperski et al. |
| 2007/0050351 A1 | 3/2007 | Kasperski et al. |
| 2007/0078828 A1 | 4/2007 | Parikh et al. |
| 2007/0143262 A1 | 6/2007 | Kasperski |
| 2007/0282811 A1 | 12/2007 | Musgrove |
| 2008/0040323 A1* | 2/2008 | Joshi ................ G06F 17/30637 |
| 2008/0097975 A1 | 4/2008 | Guay et al. |
| 2008/0109401 A1 | 5/2008 | Sareen |
| 2008/0126308 A1 | 5/2008 | Wooldridge et al. |
| 2008/0140699 A1* | 6/2008 | Jones ................ G06F 17/30646 |
| 2008/0147637 A1* | 6/2008 | Li ..................... G06F 17/30672 |
| 2008/0177717 A1 | 7/2008 | Kumar et al. |
| 2008/0195577 A1 | 8/2008 | Fan et al. |
| 2008/0208825 A1 | 8/2008 | Curtis et al. |
| 2008/0215553 A1 | 9/2008 | Badros |
| 2008/0221983 A1 | 9/2008 | Ausiannik |
| 2008/0249786 A1* | 10/2008 | Oldham ............. G06F 17/30864 705/1.1 |
| 2008/0256061 A1 | 10/2008 | Chang et al. |
| 2008/0270932 A1* | 10/2008 | Diaz .................. G06F 3/04812 715/780 |
| 2008/0301098 A1 | 12/2008 | Bernard |
| 2008/0319952 A1 | 12/2008 | Carpenter et al. |
| 2009/0043741 A1 | 2/2009 | Kim |
| 2009/0049020 A1 | 2/2009 | Im |
| 2009/0083232 A1 | 3/2009 | Ives et al. |
| 2009/0094145 A1 | 4/2009 | Kim et al. |
| 2009/0094211 A1 | 4/2009 | Marvit |
| 2009/0094551 A1 | 4/2009 | Alkov et al. |
| 2009/0106224 A1 | 4/2009 | Roulland et al. |
| 2009/0106231 A1* | 4/2009 | Najork .............. G06F 17/30864 |
| 2009/0119289 A1 | 5/2009 | Gibbs |
| 2009/0171929 A1* | 7/2009 | Jing .................. G06F 17/3064 |
| 2009/0179778 A1 | 7/2009 | Molla |
| 2009/0187515 A1* | 7/2009 | Andrew ............. G06F 17/3064 706/12 |
| 2009/0240683 A1* | 9/2009 | Lazier ............... G06F 17/30864 |
| 2009/0248666 A1 | 10/2009 | Ahluwalia |
| 2009/0287680 A1 | 11/2009 | Paek et al. |
| 2010/0005086 A1 | 1/2010 | Wang |
| 2010/0057698 A1* | 3/2010 | Prasad Kantamneni ......................... G06F 17/3097 707/E17.015 |
| 2010/0082604 A1 | 4/2010 | Gutt et al. |
| 2010/0131481 A1 | 5/2010 | Suddreth et al. |
| 2010/0146012 A1 | 6/2010 | Beaudreau et al. |
| 2010/0185644 A1* | 7/2010 | Gutt .................. G06F 17/30864 707/759 |
| 2010/0228710 A1 | 9/2010 | Imig |
| 2010/0306228 A1 | 12/2010 | Carpenter et al. |
| 2011/0055189 A1* | 3/2011 | Effrat .................. G06F 17/3064 707/706 |
| 2011/0093488 A1 | 4/2011 | Amacker et al. |
| 2011/0201387 A1 | 8/2011 | Paek et al. |
| 2011/0246575 A1 | 10/2011 | Murayama et al. |
| 2012/0023120 A1 | 1/2012 | Kanefsky |
| 2012/0047134 A1 | 2/2012 | Hansson et al. |
| 2012/0047135 A1 | 2/2012 | Hansson et al. |
| 2012/0167009 A1 | 6/2012 | Davidson et al. |
| 2014/0181135 A1 | 6/2014 | Hansson et al. |

OTHER PUBLICATIONS

'Closure Library (Labs).' Finding Your Way around the Closure Library—Closure Library—Google Code [online]. 2011 [retrieved on Aug. 16, 2011]. Retrieved from the Internet electronic mail: http://code.google.com/closure/library/doc/introduction.html, 3 pages.

'Closure Templates (Labs).' Closure Templates—Google Code [online]. 2011 [retrieved on Aug. 16, 2011]. Retrieved from the Internet electronic mail http://code.google.com/closure/templates, 2 pages.

'Closure-Library.' closure-library—Closure Library—Google Project Hosting [online]. 2011 [retrieved on Aug. 16, 2011]. Retrieved from the Internet electronic mail: http://code.google.com/p/closure-library/, 1 page.

'JSONP' JSONP—Wikpedia, the free encyclopedia [online]. [retrieved on Aug. 16, 2011]. Retrieved from the Internet electronic mail: http://en.wikipedia.org/wiki/JSONP, 4 pages.

'The official Google Code blog.' Introducing Closure Tools—The official Google Code blog [online]. Nov. 5, 2009 [retrieved on Aug. 16, 2011]. Retrieved from the Internet electronic mail: http://googlecode.blogspot.com/2009/11/introducing-closure-tools.html, 10 pages.

'The Real Live Search' http://www.istartedsomething.com/livesearch. [online] [retrieved on Aug. 5, 2011] 1 page.

'XMLHttpRequest.' XMLHttpRequest—Wikipedia, the free encyclopedia [online]. Last modified on Aug. 11, 2011 [retrieved on Aug. 16, 2011]. Retrieved from the Internet electronic mail: http://en.wikipedia.org/wiki/XHR, 8 pages.

Chennavasin, Don "A look inside the world of search from the people of Yahoo!" http://www.ysearchblog.com/archives/000301.html. Yahoo! Search blog: Livesearch on AlltheWeb, May 9, 2006, 5 pages.

McGee, Matt "Yahoo Had Instant Search in 2005 & Dropped It; Bing Kind of Has It Now," http://www.searchengineland.com. Sep. 9, 2010, 12 pages.

YouTube.com "Livesearch: Predictive Search Engine from Yahoo (2006)" http://www.youtube.com/watch?v=_EaSocSYSB8. [online] [retrieved Aug. 19, 2011].

(56) References Cited

OTHER PUBLICATIONS

Office Action issued in Australian Application No. 2011291549 dated Jul. 29, 2014, 3 pages.
Office Action issued in Australian Application No. 2011291544 dated Jul. 24, 2014, 3 pages.
Sentinel: A multiple engine information retrieval and visualization system, Fox et al, Journal of the American Society for Information Science, 50(7), pp. 616-625, 1999.
A metadatabase system for semantic image search by a mathematical model of meaning, Kiyoki et al, SIFMOD RECORD, 23(4), pp. 34-41, 1994.
Faceted metadata for image search and browsing, Yee et al, Proceedings of the SIGCHI Conference on Human Factors in Computing Systems, pp. 401-408, 2003.

* cited by examiner

PREDICTIVE QUERY COMPLETION AND PREDICTIVE SEARCH RESULTS

CROSS-REFERENCE TO RELATED APPLICATIONS

This application is a continuation of and claims priority to U.S. patent application Ser. No. 14/195,116, filed on Mar. 3, 2014, which is a continuation of and claims priority to U.S. patent application Ser. No. 13/213,904, filed on Aug. 19, 2011, which claims priority under 35 USC § 119(e) to U.S. Patent Application Ser. No. 61/375,222, filed on Aug. 19, 2010, the entire contents of which are hereby incorporated by reference.

BACKGROUND

This specification describes technologies relating to search query suggestions and search results.

The Internet provides access to a wide variety of resources, for example, video files, image files, audio files, or Web pages, including content for particular subjects, book articles, or news articles. A search system can select one or more resources in response to receiving a search query. A search query is data that a user submits to a search engine to satisfy the user's informational needs. The search queries are usually in the form of text, e.g., one or more query terms. The search system selects and scores resources based on their relevance to the search query and on their importance relative to other resources to provide search results that link to the selected resources. The search results are typically ordered according to the scores and presented according to this order.

Search systems can provide search suggestions to users to help users satisfy their informational needs. As used herein, the term "query suggestion" is a suggested data for a query that can be used to refine a search or refine a search strategy. Some search systems provide query suggestions in the form of a list of query suggestions as the user is typing a query. The user can select one of the query suggestions from the list without having to type the entire query suggestion. A client device typically sends suggestion requests to a search engine with each keystroke, and the search engine provides the query suggestions with prefixes that match the entered characters. Once received, the client device displays these suggestions for user selection.

Such query suggestion systems work fairly well and enrich the user experience. However, these systems still require multiple inputs from users. For example, a user must select one of the suggestions by means of a keyboard input, mouse click, or some other input. The user may also need to provide an additional input to cause the selected query to be sent to the search system, such a pressing a return key.

Once the query is processed by the search system, the search system returns search results responsive to the query. However, if the search results do not satisfy the user's informational need, the user must begin entering a new query.

Some search systems also provide predicted search results with query suggestions. Many query suggestions, however, are not selected by a user. As a result, the user may receive many search results that do not satisfy the user's information need. Additionally, the bandwidth requirements to send search results are more than the requirements for sending suggestions. As a result, the search system utilizes excessive bandwidth.

SUMMARY

This specification describes technologies relating to providing search query suggestions and search results related to the search query suggestions.

In general, one aspect of the subject matter described in this specification can be embodied in methods that include the actions of receiving from a client device a request for a search resource; providing to the client device in response to the request for the search resource, the search resource including interface instructions that cause the client device to generate a search interface that includes a query input field; receiving query suggestion requests from a client device, each query suggestion request having been generated in response to a query input in the query input field; in response to each query suggestion request: providing query suggestions responsive to the request, determining if a prediction criterion is met, the prediction criterion being independent of a user selection of a query suggestion provided in response to one or more query suggestion requests and independent of receiving a completed query from the client device; in response to determining that the prediction criterion is met, providing search results to the client device, the search results being responsive to one of the query suggestions provided in response to the query suggestion request or one or more previous query suggestion requests; and in response to determining that the prediction criterion is not met, not providing the search results to the client device. Other embodiments of this aspect include corresponding systems, apparatus, and computer program products.

Particular embodiments of the subject matter described in this specification can be implemented so as to realize one or more of the following advantages. In the absences of a user selection of a search query suggestion or sending a search request for a completed query, search results are shown only if a prediction criterion is met. This selective display of search results realizes a user experience that does not overwhelm the user with different search results being displayed with each keystroke. The selective display of search results reduces the likelihood of "search result" blindness that may occur if search results are displayed without any predictive criterion, and also reduces the likelihood of inadvertent "topic drift" that may otherwise occur in the presence of different search results being displayed with each keystroke.

The search results can be displayed by use of "fade-in" and "fade-out" techniques, or other transitional techniques, which result in smooth transitions within the user interface that are less distracting than abrupt changes that may otherwise occur.

The search query suggestions can be re-ordered from an organic order into stemmed groups that closely match typing inputs, which provide a visual indication of search queries that are closely related to the search results that are shown in the event a prediction criterion is met.

Each of the advantages above is optional and can be achieved separately or in combination.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

This specification describes technologies relating to providing query suggestions in response to a query suggestion request and providing search results for at least one of the suggestions if a prediction criterion is met. When the prediction criterion is met, search results are provided to a client device associated with the query suggestion request and presented in a search interface. The search results are provided to the client device without receiving a search result request (e.g., without a user selecting one of the query suggestions or causing the client device to send a search request to the search engine).

The prediction criterion can be a probability, a timeout or some other signal of likely user interest. For example, a determination can be made that the probability a user will select one of the query suggestions is above a threshold value. Search results associated with the query suggestion with the probability above the threshold value can be provided to the client device. Alternatively, a determination can be made that a timeout occurred and search results associated with a highest ranked query suggestion (e.g., a most frequent query suggestion or a query suggestion with the highest probability of being selected) can be provided to the client device. Alternatively, detection of a language boundary (e.g., a syllable, a word, or a bi-gram) can cause a prediction criterion to be met.

Various user interface techniques are used to create a user experience in which the search results appear and disappear in a smooth and unobtrusive manner.

§1.1 Example Environment

Figure 1:
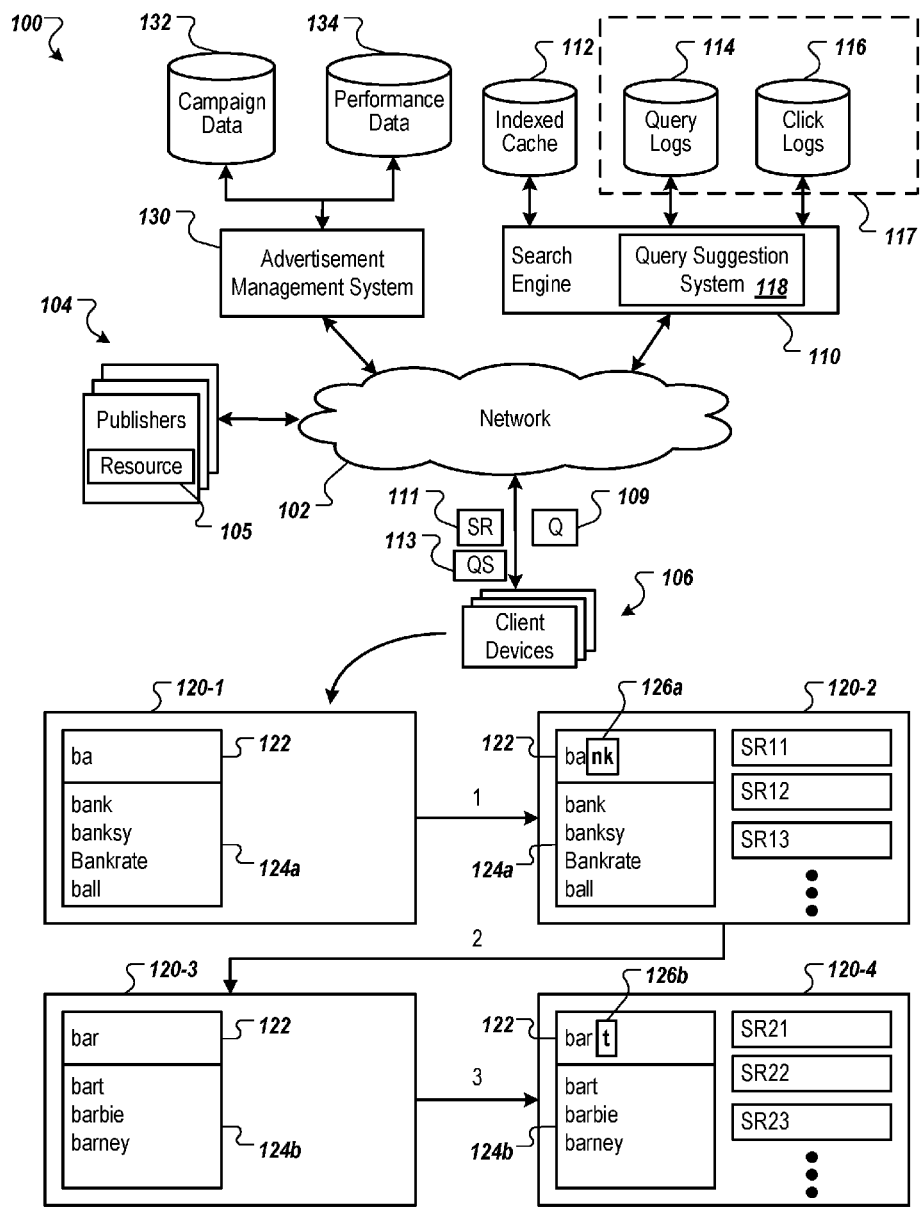
FIG. 1 is a block diagram of an example environment in which a search engine provides search services.

FIG. 1 is a block diagram of an example environment 100 in which a search engine 110 provides search services. A computer network 102, such as a local area network (LAN), wide area network (WAN), the Internet, or a combination thereof, connects publisher web sites 104, client devices 106, and the search engine 110. The online environment 100 may include many thousands of publisher web sites 104 and client devices 106.

A web site 104 is a one or more web page resources 105 associated with a domain name, and each web site is hosted by one or more servers. An example web site is a collection of web pages formatted in hypertext markup language (HTML) that can contain text, graphic images, multimedia content, and programming elements, such as scripts. Each web site 104 is maintained by a publisher, e.g., an entity that manages and/or owns the web site.

A resource is any data that can be provided by the publisher 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as JavaScript scripts).

A client device 106 is an electronic device that is under the control of a user and is capable of requesting and receiving resources over the network 102. Example client devices 106 include personal computers, mobile communication devices, and other devices that can send and receive data over the network 102. A client device 106 typically includes a user application, such as a web browser, to facilitate the sending and receiving of data over the network 102. The web browser can enable a user to display and interact with text, images, videos, music and other information typically located on a web page at a website on the world wide web or a local area network.

To facilitate searching of these resources 105, the search engine 110 identifies the resources by crawling the publisher web sites 104 and indexing the resources provided by the publisher web sites 104. The indexed and, optionally, cached copies of the resources are stored in an indexed cache 112.

The client devices 106 submit search queries 109 to the search engine 110. The search queries 109 are submitted in the form of a search request that includes the search request and, optionally, a unique identifier that identifies the client device 106 that submits the request. The unique identifier can be data from a cookie stored at the client device, or a user account identifier if the user maintains an account with the search engine 110, or some other identifier that identifies the client device 106 or the user using the client device.

In response to the search request, the search engine 110 uses the indexed cache 112 to identify resources that are relevant to the queries. The search engine 110 identifies the resources in the form of search results 111 and returns the search results to the client devices 106 in search results page resource. A search result is data generated by the search engine 110 that identifies a resource that satisfies a particular search query, and includes a resource locator for the resource. An example search result can include a web page title, a snippet of text extracted from the web page, and the URL of the web page.

The search results are ranked based on scores related to the resources identified by the search results, such as information retrieval ("IR") scores, and optionally a separate ranking of each resource relative to other resources (e.g., an authority score). In some implementations, the IR scores are computed from dot products of feature vectors corresponding to a query and a resource, and the ranking of the search results is based on relevance scores that are a combination of the IR scores and authority scores. The search results are ordered according to these scores and provided to the client device according to the order.

The client devices 106 receive the search results pages and render the pages for presentation to users. In response to the user selecting a search result at a client device 106, the client device 106 requests the resource identified by the resource locator included in the selected search result. The publisher of the web site 104 hosting the resource receives the request for the resource from the client device 106 and provides the resource to the requesting client device 106.

In some implementations, the queries 109 submitted from client devices 106 are stored in query logs 114. Click data for the queries and the web pages referenced by the search results are stored in click logs 116. The query logs 114 and the click logs 116 define search history data 117 that include data from and related to previous search requests associated with unique identifiers. The click logs define actions taken responsive to search results provided by the search engine 110. The query logs 114 and click logs 116 can be used to map queries submitted by the client devices to web pages that were identified in search results and the actions taken by users (i.e., that data are associated with the identifiers from the search requests so that a search history for each identifier can be accessed). The click logs 116 and query logs 114 can thus be used by the search engine to determine the sequence of queries submitted by the client devices, the actions taken in response to the queries, and how often the queries are submitted.

An advertisement management system 130 facilitates the provisioning of advertisements with the resources 105. In particular, the advertisement management system 130 allows advertisers to define targeting rules that take into account attributes of the particular user to provide targeted advertisements for the users. Example targeting rules include keyword targeting, in which advertiser provide bids for keywords that are present in either search queries or webpage content. Advertisements that are associated with keywords having bids that result in an advertisement slot being awarded in response to an auction are selected for displaying in the advertisement slots.

These targeted advertisements can be provided for many different resources, such as the resources 105 of the publishers 104, on a search results page resource, and, as will be described in more detail below, with a resource that includes the search engine interface 120. For example, a resource 105 from the syndication publisher 104 includes instructions that cause the client device to request advertisements from the advertisement management system 130. The request includes a publisher identifier and, optionally, keyword identifiers related to the content of the resource. The advertisement management system 130, in turn, provides targeted advertisements to the particular user. When a user selects an advertisement, the client device 106 generates a request for a landing page of the advertisement, which is typically a webpage of the advertiser.

With respect to a search results page, the client device renders the search results page and sends a request to the advertisement management system 130, along with one or more keywords related to the query that the user provide to the search engine 110. However, as will be described in more detail below, in some implementations, advertisements can be based on keywords related to query suggestions, and the advertisements can be provided with the search results that are provided in response to a prediction criterion being met. In other variations, which are also described in more detail below, advertisements can also be provided based on a current query input that does not constitute a completed query input, e.g., advertisements can be provided based on a single character input, or on a current input that forms a stem for many different words. In a manner similar to keyword targeting, advertiser submit stem bids for word stems. When a query input is a query stem that matches a word stem, advertisements that are associated with query stems having stem bids that result in an advertisement slot being awarded in response to an auction are selected for displaying in advertisement slots.

The advertisement management system 130 includes a data storage system that stores campaign data 132 and performance data 134. The campaign data 132 stores advertisements, targeting information, and budgeting information for advertisers. The performance data 134 stores data indicating the performance of the advertisements that are served. Such performance data can include, for example, click through rates for advertisements, the number of impressions for advertisements, and the number of conversions for advertisements. Other performance data can also be stored. In some implementations, the performance data 134 can be partitioned based on queries that are actually entered by users (e.g., queries that a user types and then selects a "search" command) and on queries that are suggested. As the performance of advertisements may vary based on the query type (e.g., actually entered queries and suggested queries), the advertisements that are selected for a query consisting of particular words can vary on whether the query is actually entered or suggested.

The campaign data 132 and the performance data 134 are used as input parameters to an advertisement auction. In particular, the advertisement management system 130, in response to each request for advertisements, conducts an auction to select advertisements that are provided in response to the request. The advertisements are ranked according to a score that, in some implementations, is proportional to a value based on an advertisement bid and one or more parameters specified in the performance data 134.

§1.2 Query Suggestions

In addition to providing search results in response to queries, the search engine 110, by use of a query suggestion system 118, provides query suggestions 113 to a client device. The query suggestions 113 can be provided by the search engine 110 in response to a query suggestion request from the client device. The query suggestion system 118 accesses the search history data 117 and determines a list of query suggestions based on search queries that have the query characters as a stem (or, alternatively or in addition, queries that are related by topic or co-occurrence). In some implementations, the query suggestions are based on search history data 117 associated with the unique identifier of the client device that submitted the query suggestion request. For example, the query suggestions can be suggestions based on frequency co-occurrence and query stemming of queries stored in query logs 114, and then filtered according to the particular search history data 117 associated with the unique identifier.

To illustrate, assume a client device requests a search resource from the search engine 110. The search engine 110 provides the requested search resource and interface instructions to the client device. The search resource and interface instructions cause the client device to generate a search interface 120 that includes a query input field 122. For example, the client device can launch a web browser and request a web, an image, or a video search page from the search engine 110. In some implementations, the client device can request a search page that searches a combination of text, images, and/or videos. The search engine 110 can provide HTML and scripts that cause the client device to generate the search interface 120 with the query input field 122.

The query input field 122 can receive query characters from a user, e.g., keystroke inputs, and provides each input to the search engine 110 in the form of a query suggestion request. In response to the query suggestion request, the query suggestion system 118 identifies and ranks query suggestions according to an order from highest rank to a lowest rank, and provides the client device with the query suggestions 113. For example, the query suggestion system 118 can access the search history data 117 and determine query suggestions based on search queries that have the query characters "ba" as a query stem, e.g., "bank," "banksy," "Bankrate," "ball," etc.

Various ranking algorithms can be used. In some implementations, the query suggestions are ranked based on the probability of the query suggestion being selected by a user. In some implementations, the query suggestion with the highest rank is the shortest word with the highest probability of being selected by the user. In some implementations, the query suggestions are ranked or re-ranked so natural extensions are shown and grouped together.

The client device receives the query suggestions 113 and renders the first query suggestions according to an order. The first query suggestions can be presented in a query suggestion box 124a according to an order from a highest rank to a lowest rank. For example, the client device can present the first query suggestions in the query suggestion box 124a in the search interface 120. The query suggestions can be presented in the query suggestion box 124a such that the first query suggestion (e.g., "bank") has the highest probability of being selected by a user, the second query suggestion (e.g., "banksy") has the second highest probability, and so on.

§2.0 Search Results for Predicted Query Completions

In response to the query suggestion request and providing the query suggestions, the search engine 110 determines if a prediction criterion is met. The prediction criterion is independent of a user selection on the client device of a query suggestion provided in the first query suggestions, and is independent of user selection on the client device to generate a search request, e.g., selection of a search button or the user pressing enter. When a prediction criterion is met, search results responsive to one of the query suggestions are sent to the client device and displayed.

For a time based prediction criterion, the search engine 110 can determine that the prediction criterion is met when a timer initialized in response to the query suggestion request expires after a predefined time period and no additional query suggestion requests are received during the predefined time period. For example, the search engine 110 can receive the first query suggestion request and initialize and start a timer that expires after one second. The search engine 110 can monitor the timer and determine that the prediction criterion is met if the timer expires after two seconds and before another query suggestion is received. If the timer expires before another query suggestion is sent, then search results responsive to one of the query suggestions are sent to the client device and displayed. Alternatively, if the relevant search results are already present on the client device (e.g., cached), then the search results stored in the cache are displayed.

In some implementations, probability data indicates, for each query suggestion, a respective probability of being selected by the user. Thus, in some implementations, the prediction criterion can be based on this probability, or can be combined with a time-based prediction criterion. The search engine 110 can identify the query suggestion with the highest respective probability relative to the probabilities of the other query suggestions provided to the client device, and then determine that the prediction criterion is met when the highest respective probability of the query suggestion exceeds a threshold probability that is greater than zero. For example, the search engine 110 can determine that the query suggestion "bank" has a higher probability of being selected than the query suggestions "banksy," "Bankrate," and "ball." The search engine 110 compares the probability of the query suggestion "bank," e.g., five percent, with a threshold probability, e.g., three percent, and determines that search results associated with the query suggestion "bank" should be sent to the client device and displayed, or, alternatively, displayed from the cache if they are already present on the client device.

In some implementations, the query suggestions can also be ordered so that natural extensions are shown and grouped together. In these implementations, the shortest query suggestion in a group can be presented first, even though the shortest query suggestion may not have the highest probability of being selected by a user. For example, "Bankrate" can have a probability of five percent and "bank" can have a probability of four percent of being selected by the user. The search engine 110 can compare the probability of the query suggestion "bank" to the threshold probability and determine that search results associated with the query suggestion "bank" are to be sent to the client device.

The prediction criterion can also be based on a language model. For example, a prediction criterion can be met if the search engine 110 detects a language boundary in the query input associated with the first query suggestion request. The language boundary can be a syllable, a word, or a bi-gram, to name a few examples.

The providing and displaying of search results in response to prediction criteria being met is illustrated in FIG. 1 in the four time-sequenced representations 120-1-120-4 of the search resource 120. In the representation 120-1, the user has input the partial query "ba", and a search criterion has been met. Accordingly, the search results SR11, SR12, SR13 . . . are provided and displayed, as indicated in the representation 120-2.

As used herein, a "partial query" is a query input that can be completed to form completed query of one or more words. A partial query can thus be one or more keyboard inputs that define a prefix or stem of a word, or can also be an entire word or words. For example, the letter "a" is a partial query, is the letter "a" is the stem for the words "aardvark," "Appalachia," etc. The partial query itself can also be a word, such as the letter "a" is a word. Likewise, the word "New" is also a partial query, as it can be combined with "York", "London", etc., to form other queries, and the partial query "New York" can be combined with "Mets" or "Yankess" to form other queries.

When a partial query is a word stem of one or more characters ordered in a sequence and to which one or more characters can be attached to the end of the sequence to form a word, the partial query is also referred to as a query stem.

Typically, a query stem does not constitute a complete word, or constitutes only a word of few characters, e.g., "a" or "an". Query stems can be targeted separately from keywords, as will be discussed in more detail below.

When search results are to be displayed in response to a prediction criterion being met, the client device, executing the instructions, generates an indication in the search interface that indicates the query suggestion for which the results are responsive. In some implementations, the indication can be an automatic completion of a query input in the query input field 122 indicating the query suggestion for which the search results are responsive. The automatic completion includes differentiated text 126a appended to the query input in the query input field 122. For example, the differentiated text in the query input field 122 can be presented with a gray scale background. In some implementations, the differentiated text 126a has a color background. In some implementations, the font of the differentiated text 126a can have a different font than the query input, e.g., bold, italics, font type, etc. The cursor in the text input field, however, remains at the last actual input, i.e., after the letter "a" in the stem "ba", so that user may resume or continue typing to add to the stem "ba".

Other indications can also be used. For example, the query suggestion "bank" can be highlighted in the query suggestion box 124a, e.g., with a box or a background color.

The client device can display the first search results in substantial synchronization with the indication in the search interface 120 that indicates the first query suggestion for which the first search results are responsive. For example, the client device can display the search results "SR11," "SR12," "SR13," etc., in the search interface 120 at the same time that the differentiated text 126a is displayed in the search interface 120. In another example, the search results are presented after the differentiated text is shown, e.g., after a short delay (e.g., one second or less).

As described above, the interface instructions can cause the client device to generate a query suggestion request in response to each character input in the query input field 122. Suppose, for example, the user continues typing, and enters the letter "r", as shown in the representation 120-3. The query input field 122 can receive the character "r" to form a query input of "bar." The scripts can receive the query input of "bar" and cause the client device to provide "bar" as a subsequent query suggestion request to the search engine 110 (or, alternatively, only the letter "r" if the search engine 110 stores a current state of the input of the client device). Because the partial query input "bar" does not match the predicted query completion "bank", the client device removes the search results SR11, SR12, SR13, etc., from view.

The search engine 110 receives the query suggestion request and provides second query suggestions responsive to the request from the client device. For example, the query suggestion system 118 can determine the second query suggestions based on the search history data 117 and the query input of "bar", and the client device renders the second query suggestions according to the order of the query suggestions. For example, the client device presents the query suggestions in a query suggestion box 124b in the order "bart," "barbie," "barney."

The search engine 110 then determine if a prediction criterion for the second query suggestions is met. Assuming the prediction criterion is met, the search engine 110 provides another set of search results to the client device responsive to a second query suggestion from the second query suggestions. For example, the search engine 110 can determine that a timer associated with the second query suggestions expired after a predefined time period and before another query suggestion request was received from the client device.

The client device receives the search results and generates an indication in the search interface 120 that indicates the second query suggestion. For example, the client device can present differentiated text 126b appended to the query input in the query input field 122, and displays the second search results "SR21," "SR22," "SR23," etc., in substantial synchronization with generating the indication in the interface that indicates the second query suggestion.

§2.1 Example Timing Diagrams

Figure 2:
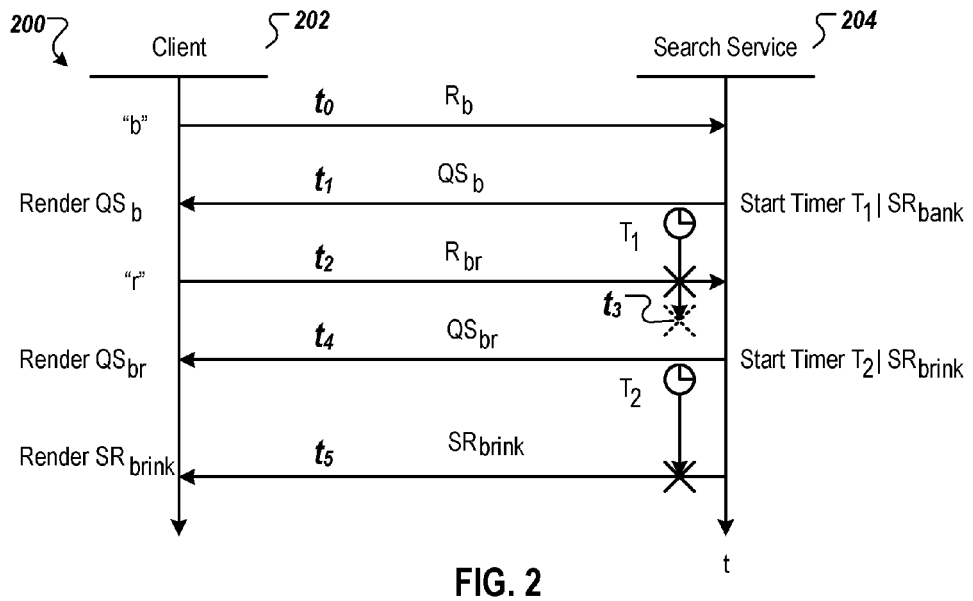
FIG. 2 is a timing diagram of an example process for determining if a timer expires and search results should be provided to a client.

FIG. 2 is a timing diagram 200 of an example process for determining if a timer expires and search results should be provided to a client. The timing diagram 200 depicts a process associated with a client 202 and a search service 204 as time elapses downward along a vertical axis t. The timer can be initiated in response to receiving a request for query suggestions, or can be initiated in response to the search service 204 providing the suggestions. In the examples that follow, the timer is initiated when the query suggestions are provided. Time periods relative to other events can also be used to define a prediction criterion, e.g., a time period after search suggestions have been presented but have not receive user interaction, or a time period between consecutive query suggestion requests, to name a few examples.

At a time $t_0$, the client 202 provides a first query suggestion request $R_b$ to the search service 204 in response to receiving a query input character "b". For example, the client 202 receives the query input character "b" from a query input field in a search interface.

The search service 204 identifies first query suggestions $QS_b$ responsive to the first query suggestion request $R_b$, and at time $t_1$ provides the suggestions to the client 202. Additionally, the search service 204 determines that the query suggestion "bank" is the highest ranked query suggestion in the first query suggestions $QS_b$ and identifies search results $SR_{bank}$ for the query "bank."

The search service 204 initializes and starts a timer $T_1$ associated with search results $SR_{bank}$. The timer $T_1$ is set to expire after a predefined time period, e.g., at time $t_3$, and the search service 204 monitors the timer $T_1$ for an expiration timeout. The search service 204 provides first query suggestions $QS_b$ to the client 202 and the client 202 renders the first query suggestions $QS_b$ in the search interface. If the timer $T_1$ expires and the search results $SR_{bank}$ are still responsive to the most recent query suggestion request, the search service 204 will provide the search results $SR_{bank}$ to the client 202.

At time $t_2$, the client 202 provides a second query suggestion request $R_{br}$ to the search service 204. For example, the query input field receives a second character "r" as input from a user and the combined query input of "br" is used for the second query suggestion request $R_{br}$.

At time $t_3$, the timer $T_1$ expires and the search service 204 determines that the search results $SR_{bank}$ are not responsive to the second query suggestion request $R_{br}$. For example, the second character in "bank" is not "r" so the user was not typing "bank" into the query input field. Alternatively, the timer $T_1$ is disabled at time $t_2$ when the search service 204 determines that the search results $SR_{bank}$ are not responsive to the second query suggestion request $R_{br}$. In either case, this results in the search service 204 not providing the search results $SR_{bank}$.

At time $t_4$, the search service 204 provides second query suggestions $QS_{br}$ responsive to the second query suggestion request $R_{br}$. The search service 204 determines that the query suggestion "brink" is the highest ranked query suggestion in the second query suggestions $QS_{br}$, and identifies search results $SR_{brink}$. The search service 204 initializes and starts a timer $T_2$ associated with search results $SR_{brink}$, where the timer will expire at time $t_5$. The client 202 renders the second query suggestions $QS_{br}$ in the search interface after they are received.

At time $t_5$, the search service 204 determines that the timer $T_2$ has expired and no query suggestion requests have been received since time $t_4$, when $T_2$ was initialized, and no other inputs have been received from the client device (e.g., an explicit command to perform a search for a particular query). The search service 204 provides the second search results $SR_{brink}$ to the client 202 and the client 202 renders the second search results $SR_{brink}$ in the search interface along with an indication of the query suggestion 'brink" associated with the search results $SR_{brink}$.

Figure 3:
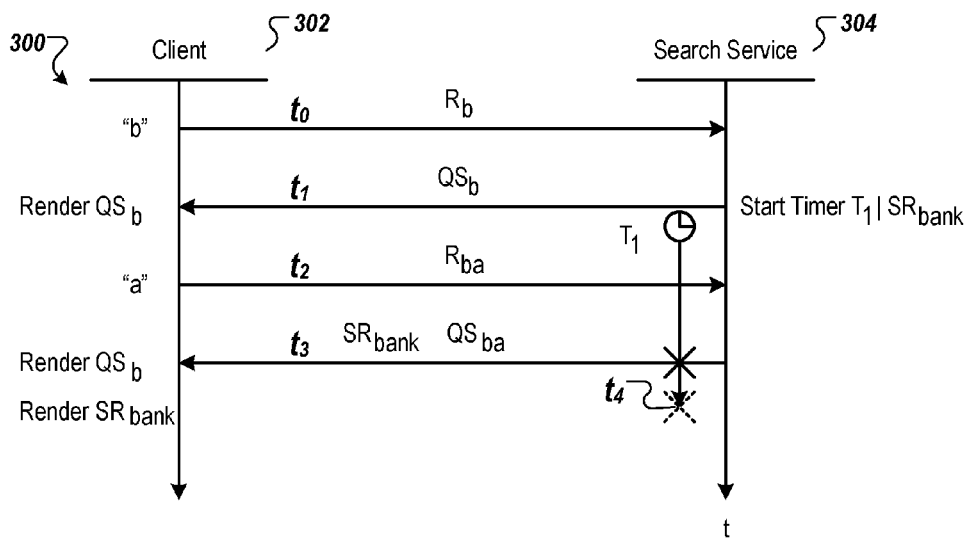
FIG. 3 is a timing diagram of an example process in which a confirmation of a query suggestion results in a prediction criterion being met.

FIG. 3 is a timing diagram of an example process in which a confirmation of a query suggestion results in a prediction criterion being met. The timing diagram 300 depicts a process associated with a client 302 and a search service 304 as time elapses downward along a vertical axis t.

The processes and steps with respect to times $t_0$ and $t_1$ are similar to those described with respect to FIG. 2 above. However, at time $t_3$, prior to time $t_4$, which is the expiration timeout for the timer $T_1$, the search service 304 receives second query suggestions $QS_{ba}$. The second query suggestions $QS_{ba}$ includes the query suggestion "bank" with the highest probability of being selected by a user. Here, the second search suggestion request, i.e., "ba", can be interpreted as a confirmation that the search results $SR_{bank}$ are of interest to the user. Accordingly, the search service 304 interprets this as meeting a prediction criterion (i.e., receiving a confirmation of a query for pending search results for that query). Accordingly, the search results $SR_{bank}$ are sent with the query suggestions $QS_{ba}$ before the timer $T_1$ expires.

Figure 4:
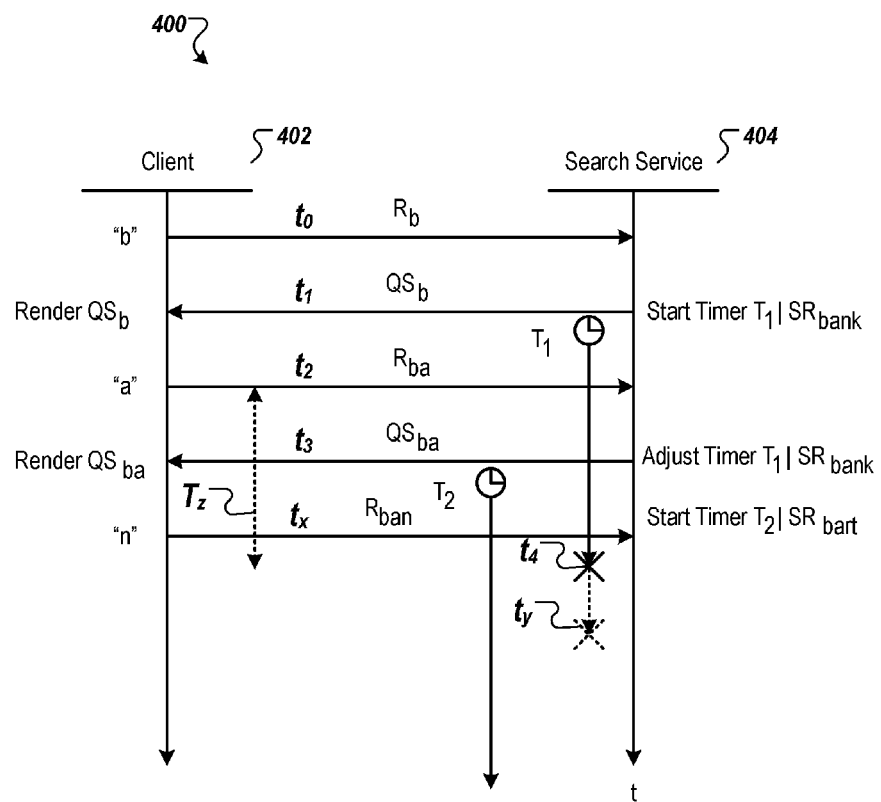
FIG. 4 is a timing diagram of a process for monitoring multiple timers.

More than one prediction criterion can be used. For example, FIG. 4 is a timing diagram 400 of a process for monitoring multiple timers. The timing diagram 400 depicts a process associated with a client 402 and a search service 404 as time elapses downward along a vertical axis t. In FIG. 4, the search service 404 is able to process two or more sets of pending search results simultaneously and decide which set to send to the client device 402.

At time $t_0$, the client 402 receives the character "b" entered in a query input field and input by a user. The client 402 provides a first query suggestion request $R_b$ to the search service 404.

At time $t_1$, the search service 404 sends first query suggestions $QS_b$, which includes the highest ranked query suggestion "bank" in response to the first query suggestion request $R_b$. The search service 404 identifies first search results $SR_{bank}$ responsive to the query suggestion "bank." The search service 404 initializes and starts a timer $T_1$ associated with the first search results $SR_{bank}$. The timer $T_1$ is initialized with a first duration that expires at time $t_5$. The search service 404 provides the first query suggestions $QS_b$ to the client 402 and the client 402 renders the first query suggestions $QS_b$ in a search interface that includes the query input field.

At time $t_2$, the client 402 provides a second query suggestion request $R_{ba}$ to the search service 404 in response to the user entering "a" in the query input field. The second query suggestion request $R_{ba}$ is received less than a threshold time period after the first query suggestion request $R_b$. For example, the query input field is receiving query input characters from a user who is a fast typist.

At time $t_3$, the search service 404 sends second query suggestions $QS_{ba}$, which again has "bank" as the highest ranked query suggestion in response to the second query suggestion request $R_{ba}$. However, the query suggestions for the input "ba" also have a very highly rated query suggestion "bart." Accordingly, the search service 404 starts a second timer $T_2$ for search results $SR_{bart}$. If no additional suggestion requests are received, then at the expiration of the timer $T_1$ the search results $SR_{bank}$ are provided. However, if the user enters the letter "r", then the search results for $SR_{bank}$ are purged, the timer $T_2$ continues, however, if no additional requests are received, and when the timer $T_2$ expires, the search results $SR_{bart}$ are provided.

The process of queuing multiple sets of search results can be extended for subsequent inputs. For example, if the client 402 sends the third query suggestion request $R_{bar}$ (not shown), the search service 404 may identify the next query suggestion with the highest rank in the third query suggestions $QS_{bar}$, for example "barn" and third search results $SR_{barn}$ associated with the query suggestion "barn." The search service 404 can initialize and start a timer $T_3$ (not shown) associated with the third search results $SR_{barn}$. The search results $SR_{bart}$ and $SR_{barn}$, and, optionally, their respective timers, are then handled in a manner similar to the way the search results $SR_{bank}$ and $SR_{bart}$ and the timers $T_1$ and $T_2$ were handled.

In other implementations, if the time period between query suggestion requests remains short (e.g., less than a threshold time period $T_z$ apart), the client 402 does not present search results in the search interface, regardless of whether the query suggestion request confirms a set of search results SR. This is because fast typing is interpreted as a signal that the user has a specific intent to enter a particular query, and thus does not need search results in the form of suggestions.

For example, suppose the user knows a particular phrase that he or she intends to enter, e.g., "banking bill held up in house of representatives." The user may type this phrase quickly and then select a "search" command in the interface 120. During this time, the user is likely to ignore any search results that are provided, and thus the search service 404 need not provide search results. For example, if at time $t_x$ after $t_2$, the search service 404 receives a third query suggestion request $R_{ban}$, and the third query suggestion request $R_{ban}$ is less than a threshold time period apart from the second query suggestion request $R_{ba}$, the search service 404 can extend the timer $T_1$ to time $t_y$ so that search results are not sent to the client 402 at time $t_4$. As long as the user continues to type quickly, the timer $T_1$, or any other timers for any other search results SR that may be pending, can continue to be extended.

In some implementations, the time periods associated with consecutive query suggestion requests can be customized to a user. For example, the search service 404 can determine that a first client used by a first user provides query suggestion requests faster than the standard predetermined time period, e.g., the user may be a fast typist compared to many other users. The standard time period can be, for example, a half a second, and the search service can determine that the first client is providing query suggestion requests every third of a second. The search service can use the customized time period (e.g., a third of a second) to determine when to provide search results to the first client. In one example, the search service 404 can identify a second client based on a client identifier. The search service 404 can use client search history information associated with the second client to determine a customized time period. This threshold time can be reduced to a minimum amount, e.g., an amount that is greater than the threshold time period $T_z$.

The example time periods above are illustrative and not exhaustive, and other time periods can also be used. For example, when the search service 404 determines that consecutive query suggestion requests are received less than a threshold time period apart, the search service 404 does not check to see if prediction criterion is met until after a time period greater than the threshold time period has passed after receiving the last query suggestion request. Conversely, a pause between query suggestion requests (e.g., greater than the threshold time period) may indicate that one of the query suggestions interests the user and the search service 404 should send search results for the highest ranked query suggestion or the query suggestion with the highest probability of being selected by the user.

In alternate implementations, the search service 404 provides the search results SR to the client device automatically with the query suggestions, and the timers are processed locally on the client device. Accordingly, the search service 404 need not monitor the state of the client device, as the client device 402 is monitoring its own state with local timers. The search results that are provided are not immediately rendered, and include metadata indicating the query suggestion to which they are responsive. At a later time (e.g., at the expiration of a timer on the client device), the client 402 searches the local cache for the relevant search results.

In some implementations, the search service 404 does not provide search results to the client device 402 when the search results have been sent to the client device 402 previously. For example, the search service 404 can store data (e.g., that expires after the end of the session) indicating the search results that have been provided to the client device 402 and the length of the cache timer associated with the results. If the search service 404 determines that a prediction criterion is met for search results that were already sent to the client device 402 (e.g., during the same session), the search service 404 does not provide the search results to the client. Examples of such data indicating the search results that have been sent include a query suggestion for which search results were sent or the search results for the query suggestion, or other data that identifies the query suggestions and search results that were previously sent to the client device.

In some implementations, the query suggestions and/or the search results can also be set to expire from the local cache after a predetermined amount of time. The expiration time can be based on the time sensitivity of query suggestions. Generally, topical queries (e.g., news, pop culture) are more time sensitive than non-topical queries (e.g., history, medicine, etc.). For example, query suggestions related to news can be set to expire after one hour, and query suggestions related to roman history can be set to expire after one day (or longer).

As described above, other prediction criterion can also be used, e.g., the probability of a query suggestion being selected being in excess of a threshold, or the current query input meeting a language boundary criterion, such as a word, a syllable, or an n-gram. The search service 404 (or the client 402) may implement any one of the above prediction criterion either alone or in combination with each other.

§2.2 Example Search Result Serving Delay Criteria

In some implementations, the search service 404 can determine that the search service 404 is unable to provide search results for all query suggestion requests received or all prediction criteria met, e.g., based on limited resources. The search service 404 can invoke serving delay criteria in order to determine when to provide search results. For example, the search service 404 can prioritize query suggestion requests based on timers, the time period between consecutive query suggestion requests, and/or probabilities that a user will select a query suggestion request. Similarly, the search service 404 can determine that there is extra bandwidth or resources that are available, and the search service 404 can remove or reduce the serving delay criteria. In some implementations, the search service 404 can invoke different delay criteria for different clients based on the number of query suggestion requests received from respective clients, the number of prediction criteria met for respective clients, based on the time interval between consecutive query suggestion requests for a respective client, and/or based on the time interval between the determination of consecutive prediction criteria being met for a respective client.

In some implementations, the search service 404 can adjust the duration of timers associated with search results. For example, if the search service 404 determines that it is unable to provide search results to some clients based on the current prediction criteria, the search service 404 can increase a global time period for all timers that determine when search results are served to a client.

In some implementations, the search service 404 can provide search results to a client every n times a prediction criterion is met or a query suggestion request is received. For example, the search service 404 can determine that there are not available resources to provide search results to the client for every query suggestion request but there are enough resources to send search results to the client for every other query suggestion request from all clients.

In some implementations, the search service 404 can increase the probability threshold associated with the probability of a user selecting a query suggestion so that the search service 404 provides search results for fewer query suggestions based on the probability threshold being met. For example, the search service 404 may determine that it cannot serve search results for all pending search suggestions in which the prediction criterion is met, and thus may increase the probability threshold to a value that reduces the likelihood of the prediction criterion being met to a level for which all requests can again be served for which the prediction criterion is met.

In some implementations, the duration of a timer associated with search results is based on the probability associated with a query suggestion the search results are responsive to. For example, search results responsive to a query suggestion with a high probability of being selected by a user can be associated with a timer having a short duration, e.g., zero seconds, 100 milliseconds, or some other short duration, and search results responsive to a query suggestion with a low probability of being selected by a user can be associated with timer having a longer duration, e.g., a half a second. In some implementations, the duration is inversely proportional to the probability according to a function, such as a logarithmic function.

In some implementations, the search service 404 throttles the provision of search results to the client 402 based on the bandwidth or data connection capabilities of the connection with the client 402. In general, the higher the bandwidth or better the data connection capability (e.g., lag time), the more aggressive the search service is in providing search results. For example, the search service 404 can determine that a client has a high bandwidth connection and thus provides the client with search results in response to each query suggestion request received. Alternatively, the search service 404 determines that a client has a low bandwidth connection and provides the client with search results after a timer with a long duration expires.

§3.0 User Interface Examples

FIGS. 5A-5I depict a web search page 500 displaying query suggestions and search results responsive one of the query suggestions. The web search page 500 can be provided by the search engine or the search service to the client device or client, described above, in response to a request for a search resource (e.g., a search page).

The web search page 500 includes a search interface 502. The search interface 502 includes a query input field 504 and can display search results responsive to a query suggestion associated with a search query in the query input field 504. The web search page 500 can display web, image, video, product, or document search results, to name a few examples.

Figure 5A:
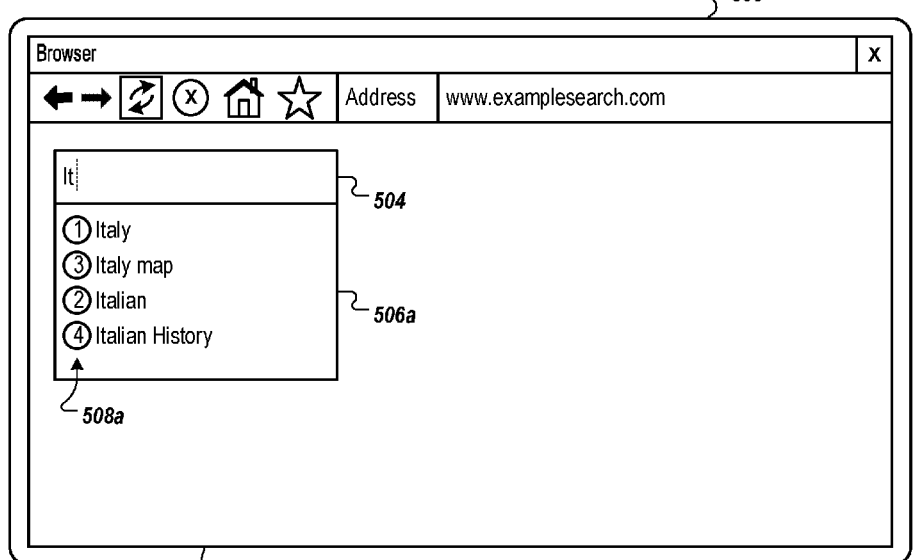
FIGS. 5A-5I depict a web search page displaying query suggestions and search results responsive one of the query suggestions.

FIG. 5A shows a query suggestion box 506a with query suggestions $QS_{It}$. The query suggestions "Italy," "Italy map," "Italian," and "Italian History" are query suggestions responsive to the query input "It" in the query input field. For example, a user has entered the text "It" into the query input field but is unsure about the specific spelling of the word "Italy" or the topic that they are searching for (e.g., "Italy" or "Italian"). The search engine can provide query suggestions $QS_{It}$ in the query suggestion box 506a in order to help the user choose a search query.

The query suggestions $QS_{It}$ can be ranked according to an order. For example, the query suggestions can be ranked based on the probability that the user will select the respective query suggestion. The ranking of the query suggestions according to probability is indicated by the numerical values 508a adjacent to the query suggestions. These values are illustrative only and are not shown in the actual user interface. In the example ranking, "Italy" has the highest probability and a rank of one, "Italian" has the second probability and a highest rank of two, "Italy map" has the third probability and a highest rank of three, and "Italian History" has the lowest probability and a rank of four.

The search engine can re-rank the query suggestions $QS_{It}$ so natural query extensions are presented together in a group. For example, according to the re-ranking, "Italy" has the highest rank, "Italy map" (with the same first term) has the second rank, "Italian" has the third rank, and "Italian History" has the fourth rank.

Figure 5B:
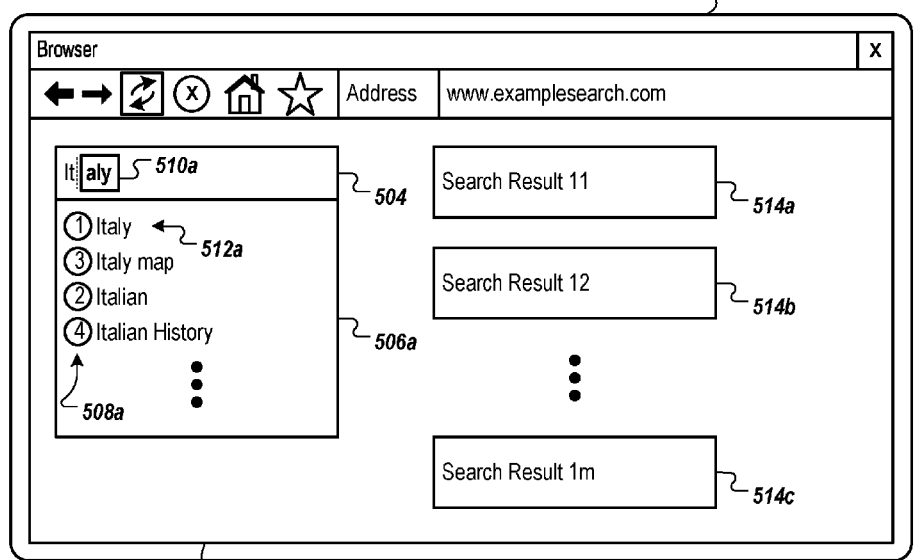

FIG. 5B shows the progression from FIG. 5A in response to a prediction criterion being met. In FIG. 5B, the search results are received at the client and the differentiated text "aly" 510a is presented in the query input field 504. The input query combined with the differentiated text "aly" 510a form one of the query suggestions ("Italy") presented in the query suggestion box 506a, e.g., the query suggestion with the highest rank.

Search results 514a-c are presented in the search interface 502. The search results 514a-c are responsive to the query suggestion "Italy" 512a. For example, the search engine receives a query suggestion request $R_{It}$ from the client device rendering the web search page 500 (e.g., a laptop displaying the web search page 500). The search engine identifies and provides query suggestions $QS_{It}$ to the client device and the client device presents the query suggestions $QS_{It}$ in the query suggestion box 506a according to a rank. The search engine determines that a prediction criterion is met and sends the search results $SR_{Italy}$ associated with the query suggestion "Italy" 512a to the web browser presenting the web search page 500. The web search page 500 presents the differentiated text "aly" 510a and the search results 514a-c in the search interface 502.

In some implementations, the client can render a proper subset of the search results. For example, the search service provides the search results $SR_{Italy}$ to the client, and the client only renders the search result 514a without rendering the search results 514b-c. After a predetermined time period of inactivity after rendering 514a, e.g., one second, which may indicate the user is interested in the search result 514a, the remaining search results may be rendered.

Figure 5C:
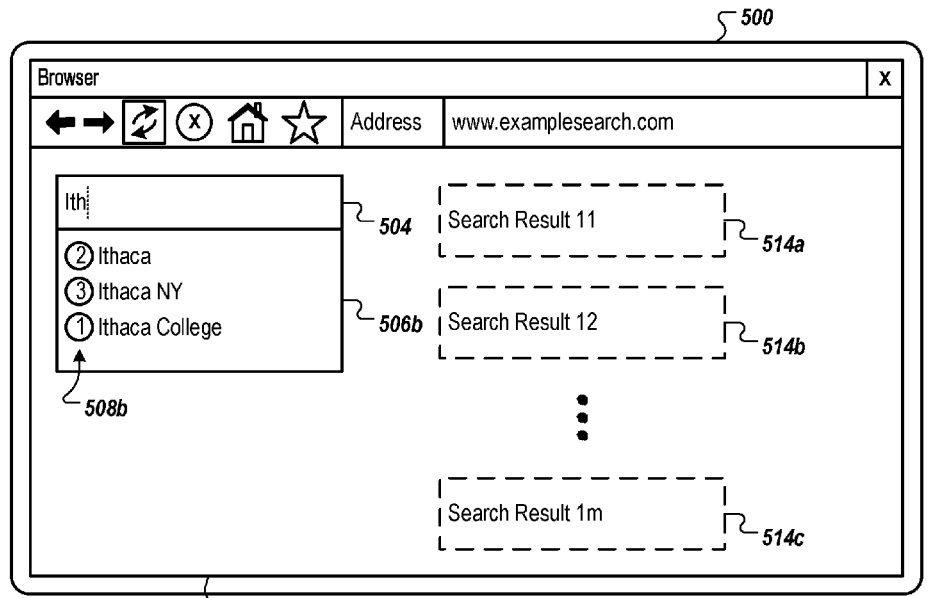

FIG. 5C shows the progression from FIG. 5B where the user enters the character "h" in the query input field 504 so that the query input presented is "Ith." Here, the partial query "Ith" is not a stem (or otherwise part of) the query suggestions $Q_{It}$. Accordingly, the search results 514a-c are not responsive to the query suggestions $QS_{Ith}$. Thus, when the client device presents the query suggestions $QS_{Ith}$ in the query suggestion box 506b, the client device also fades out the search results 514a-c, as indicated by the dashed outlines of the search results 514a-c. The fading effect can be implemented by a script or other programming instructions.

Other ways of removing search results can also be used. For example, the search results 514a-c are immediately removed from the search interface 502; they can be grayed out (e.g., the search results are changed to gray or another color and become partially transparent); or they can fade from view.

In other implementations, when the search results 514a-c are no longer responsive to the query input, the search results remain in the search interface 502 in grayed-out form, but the search interface no longer allows user interaction (e.g., selection) of the search results 514a-c in grayed out form. In an alternative implementation, the user can interact (e.g., mouse over, select, etc.) with the search results, and various actions can occur as a result. For example, mousing over a grayed out search result will cause it to appear in original form, and the user may select the search result to request the underlying resource it references. Alternatively, all of the search results may return to their original, selectable form, and the user query in the query input may revert to the query suggestion for which the search results are relevant. For example, in FIG. 5C, if the user were to mouse over search result 514a, the search results 514a-c would return to their normal form, and the query input would revert to "Italy".

Returning now to the example of FIG. 5C, the query suggestions $QS_{Ith}$ include the suggestions "Ithaca College," "Ithaca," and "Ithaca N.Y.", and are re-ranked as shown. For example, the search engine can rank the query suggestions $QS_{Ith}$ according to the length of the query suggestion or so that natural extensions are shown and grouped together.

Figure 5D:
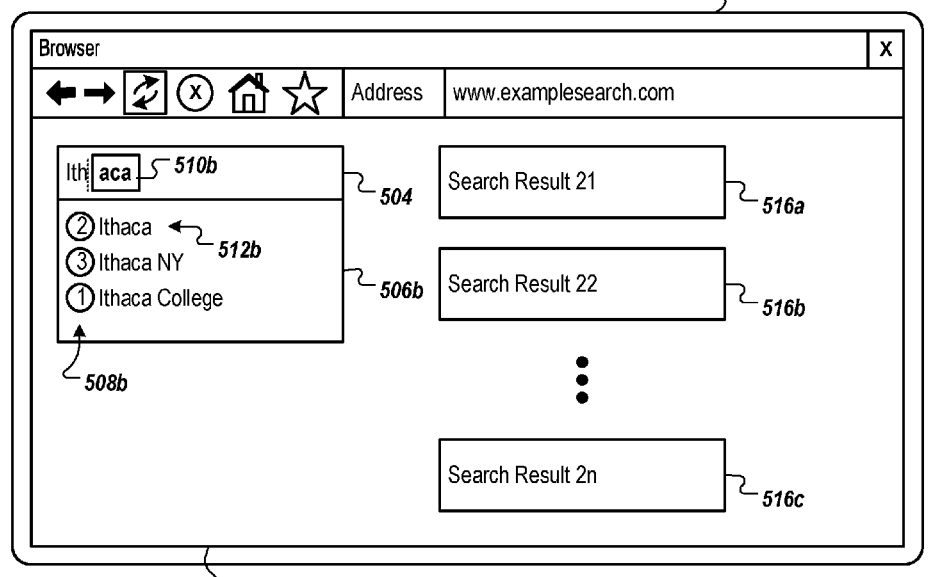

FIG. 5D shows the progression from FIG. 5C when a prediction criterion is met for the query suggestion "Ithaca" 512b and search results are presented on the search interface 502. For example, the client device receives search results $SR_{Ithaca}$ that are responsive to the query suggestion "Ithaca" 512b. The client device can present the differentiated text "aca" 510b in the query input field 504. The differentiated text "aca" 510b are the characters from the query suggestion "Ithaca" 512b that are not already present in the query input field 504.

In the examples above, search results are removed or added in response to query suggestion requests. However, there are additional ways in which search results can be show in the absence of any additional user input. One example way is by use of a presentation timeout, which occurs when a user takes no action for a specified period of time, e.g., 30 seconds, after search results are shown.

Figure 5E:
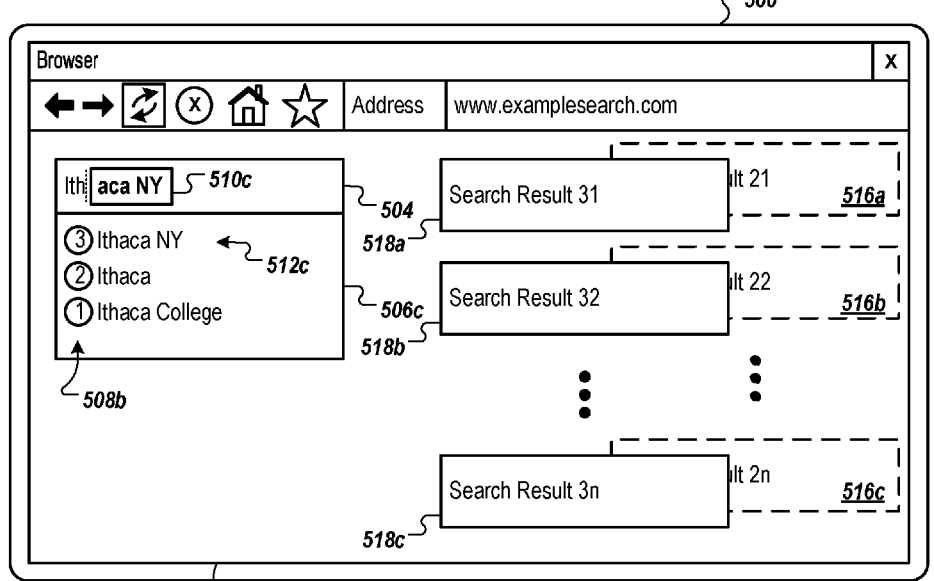
Figure 5F:
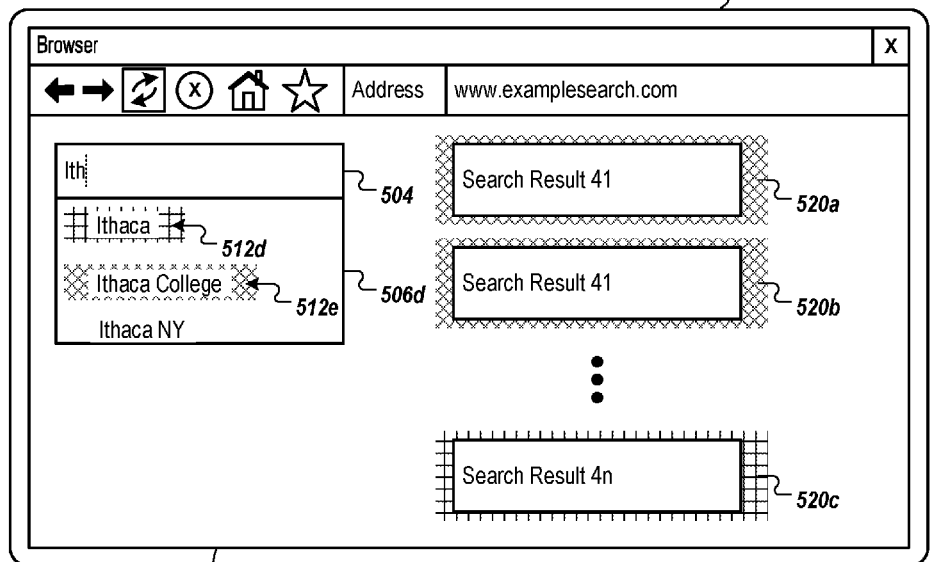

FIG. 5E shows the progression from FIG. 5D after a presentation timeout. A presentation timeout can occur when search results are presented in the search interface 502 for a predetermined time period and no user interaction within the search interface 502 is detected. For example, the search results 516a-b were presented in the search interface 502 and user interaction with the search results 516a-b during the predetermined time period was not detected. In response to the presentation timeout, the search interface 502 can automatically select a different query suggestion or re-rank the query suggestions, and notify the search engine of the selection. For example, the query suggestion "Ithaca N.Y." 512c can be switched with the query suggestion "Ithaca" so that "Ithaca N.Y." 512c is the highest ranked query suggestion in the query suggestion box 506c. In response to the notification, the search engine provides search results (e.g., search results 518a-c) for the newly selected query suggestion (e.g., "Ithaca N.Y."). In a variation of this implementation, instead of selecting a new query suggestion, the search interface 502 requests a new set of search results (e.g., a next page of search results, such as results 11-20 if results 1-10 are displayed) in response to the presentation timeout.

FIG. 5E also shows another example of how search results can be transitioned out of the search interface. Here, the search results 516a-c fade out and move to the edge of the search interface 502 while the search results 518a-c fade in and appear in the search interface 502. In other implementations, the search results 518a-c scroll onto the search interface 502 while the search results 516a-c scroll off the search interface 502.

In some implementations, a presentation timeout does not occur if the web search page 500 is minimized or no longer in focus (i.e., no longer the active view port). For example, a user can receive an email and switch to an email client. As the web search page 500 is no longer in focus, the timer for the presentation timeout is suspended. When the search page 500 returns to being the active view port, the timer resumes its countdown.

§3.1 Additional User Interface Features and Search Service Features

The user interface features and search service features described above do not constitute and exhaustive set of examples. Other user interface features and search service features can also be implements. Additional examples of user interface features and search service features are described in the following sections.

§3.1.1 Additional Query Input Field ("Searchbox") Features

In some implementations, selection of the tab key allows a user to add or complete a single word in the query input field 504 at a time. For example, if the user pressed the tab key a first time in FIG. 5D, the portion of the differentiated text "aca" would be added to the query input "Ith" changing the query input to "Ithaca" and the updated differentiated text to "_NY." Pressing the tab key a second time would change the query input to "Ithaca N.Y." and there would no longer be any differentiated text. Alternatively, the user may select from the query suggestions 512b.

In some implementations, if the client detects an unexpected "space" character (e.g., two consecutive spaces after a complete word or space that creates an unexpected word break in a word), the current input is provided as a query. For example, the input "goog" may results in the suggestions of "google maps" or "google translate." However, if the next query input is a space character, creating an input of "goog", the input "goog" is used as a query for search results.

In some implementations, the client device will revert to the query input field when a user resumes typing. For example, the search results that are provided may scroll off the web page. If the user of the client devices uses a mouse to scroll down and review search results, and then resumes typing the query input, the client device will scroll up to query input field to resume modifying the current query input.

In some implementations, the query input field includes a command (e.g., an "x" button) on a side. Selection of the command clears the query input, and can additional send a notification to the search service to kill all pending searches and timers related to the query suggestions.

In some implementations, the status field can be displayed adjacent (e.g., on top of) the query input field. The status field can indicate the predicted query suggestion for which the current search results being shown. As the user continues to type, and the search results change, the status indicator can also change when a different query suggestion is used for the search results.

In some implementations, selecting an enter command enters the predicted completion query as the search query. In these implementations, to enter the current query input, the user selects an alternate key, such as a backspace, escape, or enters an extra (or unexpected) space character.

In some implementations, search results are not automatically displayed. Instead, one or more indicators are used to indicate when search results are ready to be displayed. For example, for each search query suggestion, a small round circle may be displayed and the circle is red when there are no search results to display for the suggestions, and the circle changes to green when search results are available to display. For example, circles 508b in FIG. 5E, which represent rank and are not actually displayed, can instead be color coded red and green and actually be displayed. The user may use an arrow key or tab key, or mouse over, to change focus to certain suggestions, and when the focus is on a particular selection with a green indicator, the search results are displayed. Similarly, a progress bar that moves along as the user types, behind the text of the query input field, is displayed, and catches up with the cursor position in the query input text when the search results are received. Other indicators, such as bars in sequence (similar to a signal strength indicator), or the query input field being highlighted (e.g., the border changing to a blue color), can be used.

In some implementations, selecting a right arrow key causes a top-ranked query suggestion to be entered into the query input field. The user may then resume typing by adding to the suggestion. For example, a user may desire to enter the query "Mississippi blues festival." Instead of typing in Mississippi, the user may type "Miss→blues festival."

In some implementations, a partial query input, or a query stem, can be provided as a query to the search engine 110. In a first variation of these implementations, the partial query input can be provided to the search engine 110 as an additional query input in addition to the selected query suggestion. For example, for the partial query input "ama", the search engine 110 may select the query suggestion "amazon rain forest" for identifying search results. However, the search engine may also conduct a search on the partial query input "ama", and thus the search results that are shown in response to a prediction criteria being met include search results responsive to the query suggestion "amazon rain forest" and search results responsive to the query input "ama." The respective search results for the query suggestion and the query input can be distinguished as described above with respect to FIG. 5F, e.g., color coded, etc.

In the second variation of these implementations, the search engine 110 will only process the partial query input if a confidence measure or quality measure associated with the query suggestions are below respective thresholds. For example, for the partial query input "klf", the search engine 110 may determine that none of the query suggestions meet a confidence measure or equality measure. Accordingly, the search engine conducts a search only on the query "klf" An example confidence measure is a frequency of occurrence of the query suggestion, a probability that the query suggestion will be selected by the user, or some other measure indicative that the query suggestion is a likely completion of the query input. An example quality measure for query suggestion is a value indicating the quality of the underlying resources referenced by search results responsive to the query suggestion. For example, if a query suggestion only identifies resources that are of little importance, e.g., resources that ranked low in an authority graph, the query suggestion can have a very low quality measure. Conversely, if the query suggestion identifies resources that are of high importance, e.g., resources are ranked very high in authority graph, the query suggestion can have a very high quality measure.

§3.1.2 Additions Suggestion Features

In some implementations, suggestions that are personalized based on the user's history, along with the search results that are provided, can be protected (e.g., encrypted). Such protection can be used to prevent replay attacks and other exploits that may compromise the user's privacy. For example, data for cookie exchanges, personalized suggestions and search results can be provided over a secure socket layer (SSL).

In some implementations, an on-screen virtual keyboard can be displayed (e.g., such as in the case of a mobile device user interface), and the virtual keyboard color code certain keys that correspond to likely completions by letter.

In some indications, indicators are used to indicate the probability of completion for each query suggestion, e.g., a bar shown to the right of the suggestion. Thus the user can visualize a confidence level shown for each suggestion.

In some implementations, the user may use an arrow key or tab key, or mouse over, to change focus to certain suggestions. When the focus changes to a particular suggestion, search results for that suggestion are shown. If the user does not select a suggestion, the user may resume typing to change focus back to the current query input.

In some implementations, query suggestions are continually formed from a last word or term of a query. The last word or term of a query is used as a basis for a new query suggestion, and thus the number of terms in the query suggestions can remain unbounded.

In some implementations, a query suggestion can include a command that, when selected, causes the display of a first (e.g., most highly ranked) search result for the query. For example, in FIG. 5F, mousing over (or otherwise selecting) one of the circles next to one of the search results 522b will cause one of the corresponding search results 524a, 524b or 524c to appear. Alternatively, selecting the circle will cause the client device to request the underlying resource referenced by the corresponding search result. For example, selecting the circle next to the search result "Ithaca N.Y." causes the client device to request the resource referenced by the search result 524a.

§3.1.3 Additional Presentation Features

In some implementations, if a character is deleted from the query input (e.g., with the backspace or delete key), the search engine does not provide query suggestions to the client device, and additional query suggestions are not displayed, until a character is again added to the query input field 504.

In some implementations, if a character is deleted from the query input (e.g., by using a cut option), the search engine does not provide query suggestions to the client device and query suggestions are not displayed until the search engine determines that a character has not been deleted from the query input field 504 for a predetermined amount of time. For example, if the search interface 502 determines that changes to the query input are the removal of characters, the client device does not send a query suggestion request to the search engine until three seconds after the last character has been deleted. As with the presentation timer, the client device uses an edit timer in order to determine when to send another query suggestion request after character deletion or backspace.

In some implementations, when the search interface 502 does not detect interaction with the search results after a predetermined amount of time, search results for two or more of the query suggestions can be presented in the search interface. For example, the search result 518a is responsive to "Ithaca," the search result 518b is responsive to "Ithaca N.Y.," and the search results 518c is responsive to "Ithaca College." Indication of the query suggestion associated with the respective search results can be presented to the side of the search results. For example, the search interface 502 can include a box to the left of each search result, where the box contains the text of the query suggestion associated with the search result.

Figure 5G:
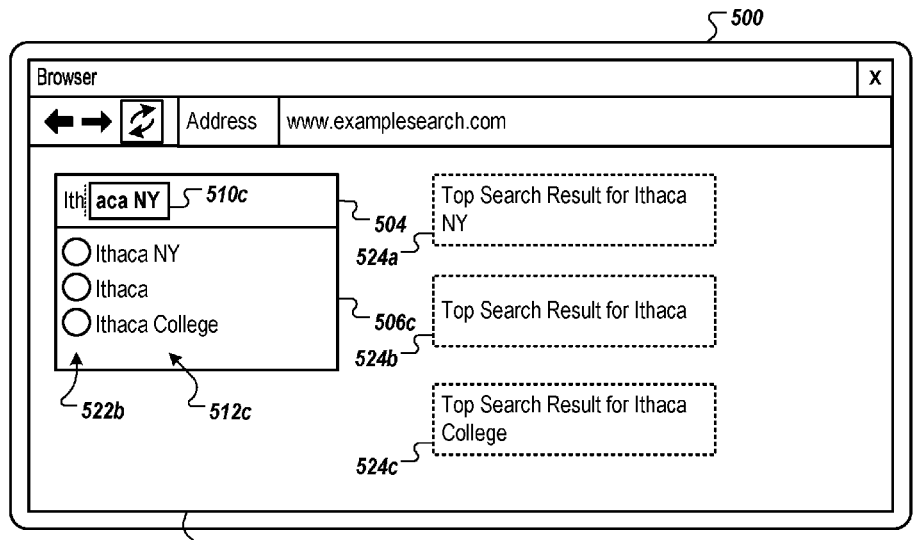

In some implementations, multiple query suggestions can have a high priority or the same priority. When this occurs, at least one search result responsive to each of the multiple query suggestions that have the high priority or probability is rendered. FIG. 5G shows two query suggestions 512d-e and search results 520a-c responsive to the two query suggestions 512d-e. For example, both of the two query suggestions 512d-e have a high probability of being selected by a user. In these implementations, the background of the query suggestions (or the text of the query suggestions) are color coded in a query suggestion box 506d and the background of the search results 520a-c (or text of the search results) are color coded to match the query suggestion the results are responsive to. For example, the search results 520a-b are responsive to the query suggestion "Ithaca College" 512e and the search result 520c is responsive to the query suggestion "Ithaca" 512d.

Accordingly, the search results that are provided can be based on the top predicted query, or on several of the top predicted queries, e.g., grouped as in FIG. 5G, or in other implementations, based on the top results (e.g., the top 1 or 2 results) for each predicted query given the user's typed prefix.

In some implementations, pressing a particular key, such as a page down key, or placing the mouse in the scroll bar to scroll down, causes the client device to page through search results that are shown for a query suggestion while still maintaining the current cursor position in the query input. Thus, the user may resume typing at any time to continue to develop the query.

Figure 5H:
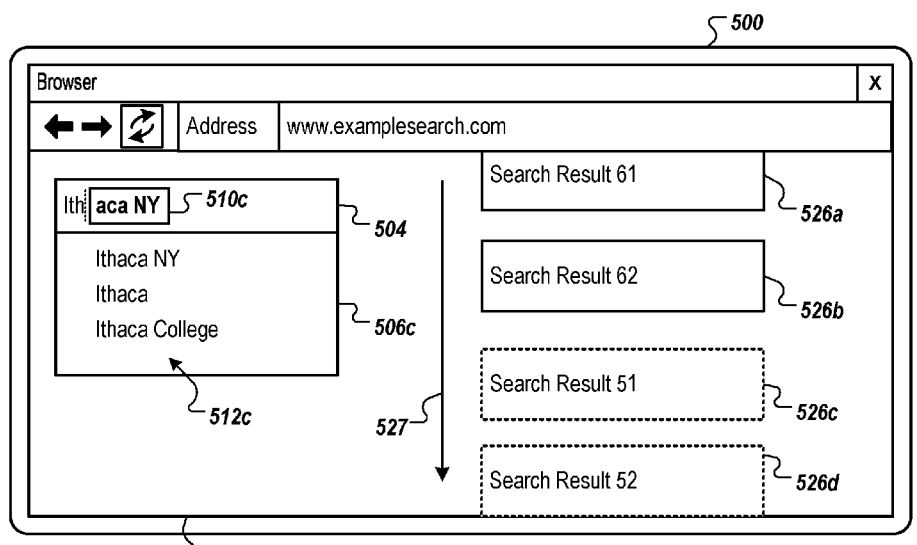

In some implementations, search results that are shown for suggestions do not disappear when the user continues to type. Instead, new search results may "scroll in" to the search page, e.g., from the top, and old search results may "scroll out" of the search page, e.g., to the bottom. Search results that are in the processing of scrolling downward and which are not search results that would be found for a current suggestion or query input are marked with an indication that indicates that the search results are "stale", i.e., not relevant to the current query suggestion. An example of this interface is shown in FIG. 5H. Search results 526 are moving in a downward direction, as indicated by the arrow 527. The search results 526a and 526b are relevant to the query suggestion "Ithaca N.Y.", while the search results 526c and 526d are relevant to the query suggestion "Italy." Accordingly, an indication, such as the search results 526c and 526d becoming transparent, or some other indicator, is generated to notify the user that the search results are stale.

In some implementations, the number of search results that are shown for a query suggestion vary, depending on whether the query suggestion is a navigational query or an informational query. A navigational query is a query that usually has only one satisfactory result, as indicated by a very high relevance score, by traffic patters, or a combination of relevance and traffic patterns. An informational query is a query that has many search results for which several or more the most popular underlying resources have a relatively evenly distributed selection rate. For an informational query, the search results are shown as above. For a navigational query, only the top result referencing the corresponding resource is shown.

In some implementations, query suggestions that cause search results that include images or other content that may distract users can be penalized in the ranking of query suggestions. Search results that provide rich content tend to attract users' attention, even if the content is not related to the users' current interests, resulting in artificial topic drift. Thus, in some implementations, the queries that cause these search results to be generated can be ranked lower than query suggestions that cause less distracting search results to appear (e.g., search results with primarily text content. In alternate implementations, the queries are not re-ranked, but the rich content is suppressed, e.g., images and video clips are not shown in the search results. In variations of these implementations, the re-ranking or suppression is dependent on the corpus being searched. For example, if the user is search web documents, re-ranking or suppression can be enabled; conversely, if the user is searching images, re-ranking or suppression is not enabled.

In some implementations, query suggestions that result in the identification of content that is classified as sensitive content, e.g., pornographic content as identified by one or more pre-existing porn classifiers, are not used for generating search results. For example, resources that are identified by a query suggestion can be checked by porn classifiers, and if a threshold number of the resources are classified as including porn (e.g., 10%, or any of the resources that would be referenced in the first page of search results, etc.), then the search results are not provided for the query suggestion. In alternate implementations, the search results are generated but are not shown automatically. Instead, a button is shown that indicates the content that will be shown is potentially sensitive, and the user must confirm that the search results can be shown.

§3.1.4 Additional Resource Management Features

In some implementations, when the client detects that characters are no longer being deleted from the query input field 504, the client can check a local cache for query suggestions and/or search results for the current query input in the query input field 504. For example, the client can provide a query suggestion request $R_{It}$ to the search service and receive query suggestions $QS_{It}$ and search results $SR_{Italy}$. The client can render the query suggestions $QS_{It}$ in the query suggestion box 506a and store the query suggestions $QS_{It}$ and the search results $SR_{Italy}$ in a local cache. The client then detects input of the character "h" in the query input field 504 and provides a query suggestion request $R_{Ith}$ to the search service, receives the query suggestions $QS_{Ith}$, and renders the query suggestions in the query suggestion box 506b. Thereafter, the user presses a backspace key to remove the character "h." The edit timer fires, and then expires after a period of inactivity. The client then determines that the current query input is "It" and checks the local cache for query suggestions and search results associated with the query input "It." Locating the query suggestions $QS_{It}$ and the search results $SR_{Italy}$, the client device then presents the query suggestions $QS_{It}$ and the search results $SR_{Italy}$ (e.g., the search results 514a-c) in the search interface 502. If the search results for the query suggestion Italy are not in the local cache, then the client can request the search results from the search service, or the search service can provide the search results, in response to a prediction criterion being met.

In some implementations, requests for query suggestions are not sent with each keystroke, but instead are sent according to a period time, e.g., every 150 milliseconds, or some other time period. This reduces the load on the search service while only causing minimal changes in the user experience.

In some implementations, the search service monitors the client device connection, and does not provide search results for a query suggestion if the client device connection is experiencing a high latency or is severely bandwidth constrained. Instead, the search service provides search results in a conventional manner, i.e., when the user issues a request for a specific query.

In some implementations, the client device is configured to progressively render the search results as they are received. In variations of this implementation, a search result that were previously provided and displayed can remain displayed when new search results are received for a new query suggestion, provide the search result that was previously provided and displayed is relevant to the new query suggestion.

§3.1.5 Mode Integration

Figure 5I:
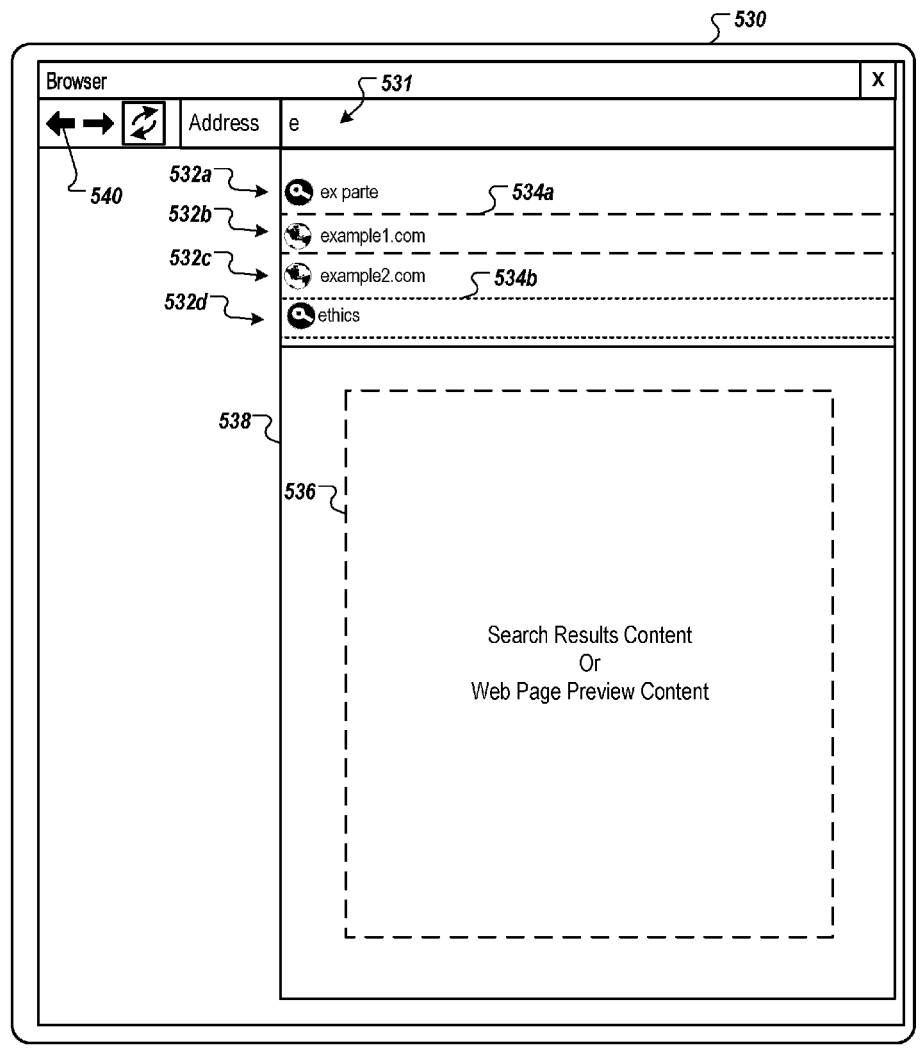

In some implementations, the suggestion service and rendering of search results can be integrated in other web browser modes. For example, FIG. 5I shows a web browser page 530 in which the user has entered the character "e" in the address bar. Suggestions 532 are shown in response. Two of the suggestions, 532b and 532c, are URLs for web pages, as indicated by the web icon adjacent to the URLs. Two other suggestions, 532a and 532d, are search query suggestions, as indicated by the search icon adjacent the search query suggestions. By use of an input device, such as an arrow key, the user can highlight one of the suggestions 532, and corresponding content 536 is shown in a preview pane 538. The corresponding content is, for example, search result content or a web page preview.

For example, if the user highlights suggestion 532b, as indicated by the dashed box 534a, then a preview of the webpage at example1.com is shown in the preview pane 538. Another input, such as an enter key input, causes the client device to navigate to the previewed web page.

Conversely, if the user highlights suggestion 532d, as indicated by the dashed box 534b, then search results are shown in the preview pane 538. The user may interact with the search results as described above. If the user selects a particular search result, then the client device navigates to the page referenced by the underlying search result. Should the user navigate back, e.g., by selecting the back browser command 540, then the client device navigates to a search interface page of the search service, such as the page 500 shown in FIG. 5A.

§3.1.6 Logging, Preference and History Features

In some implementations, a user can specify preferences for providing search results. The preference can be stored locally on the client (e.g., in a cookie) and provided to the search service, or can be stored in a user account with the search service. The preferences include a setting for when search results are to be provided (e.g., a slider or a Likert scale to adjust the prediction criterion, with a low value/setting resulting in search results not being presented or only being presented after long times (e.g., 10 seconds), and a high value/setting resulting in search results being provided with each keystroke). For example, the user can choose to render results with every set of query suggestions, or can choose that the system be very conservative and only render results after several keystrokes, after an n-second pause, etc.

In some implementations, the search service can use information about a user to determine when to provide search results to a client device. For example, the search service can determine that the time period between consecutive query suggestion requests, provided by a client associated with the user, is typically less than a threshold period of time. The search service can determine that the current time period between consecutive query suggestion requests from the client are being received at a time period that is greater than normal and provide search results to the client based on this difference.

In some implementations, the search service can store as history data the search results that were shown for query suggestions, and the query suggestions for which they were shown. These suggestions and results can be differentiated from search queries for which a user explicitly requested a search. Query suggestions for which only some positive user interaction was observed—e.g., a long pause, a selection of a search result—are persisted to the user's history, while other query suggestions that did not result in some positive user interaction are not persisted to the user's history. Thus, the user, by examining his or her history, can review queries that he or she actually entered, and can also review query suggestions for which he or she exhibited a positive user interaction. As with other user history data, the user's search history and selections are protected by one or more privacy features to protect the user's privacy.

§4.0 Example Query Server Process Flows

Figure 6:
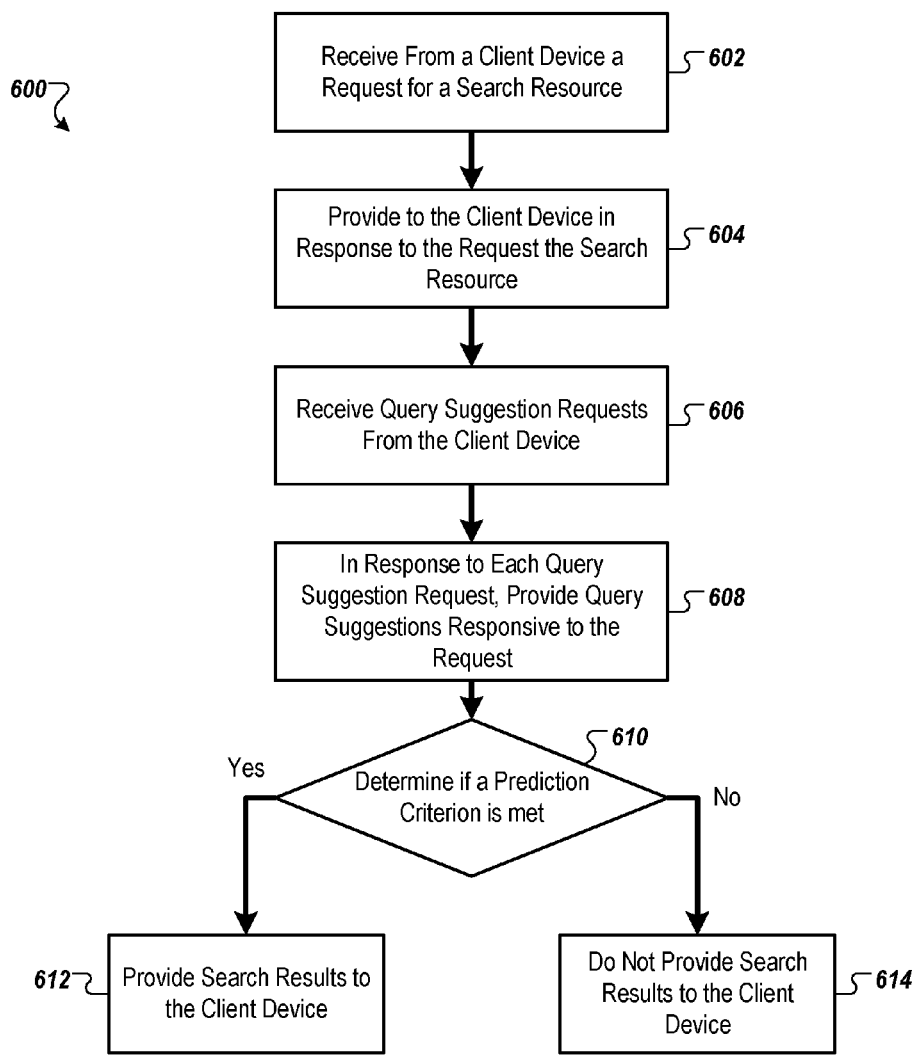
FIG. 6 is a flow diagram of a process for providing search results responsive to a query suggestion to a client device.

FIG. 6 is a flow diagram of a process 600 for providing search results responsive to a query suggestion to a client device. The process 600 can be used by the search engine to provide search results to the client device.

The search engine receives from a client device a request for a search resource (602). For example, the search engine receives a request from the client device for a web search page.

The search engine provides to the client device in response to the request the search resource (604). The search resource includes interface instructions that cause the client device to generate a search interface that includes a query input field. For example, the search engine provides the web search page, including HTML and scripts, to the client device. The client device can use the HTML and scripts to render a search interface that includes a query input field.

The search engine receives query suggestion requests from the client device (606). Each query suggestion request is generated in response to a query input in the query input field. For example, the client device can generate a query suggestion request from query input entered into the query input field by a user. The client device can provide the query suggestion request to the search engine. The client device can determine that a word or part of a word is entered into the query input field and generate a query suggestion request for each character in the word or in the partial word. Alternatively, the client device can generate a query suggestion request for every n characters, or each word input into the query input field.

In response to each query suggestion request, the search engine provides query suggestions responsive to the request (608). For example, the search engine identifies query suggestions responsive to the query suggestion request and provides the query suggestions to the client device. The search engine can identify the highest ranked query suggestion or the query suggestion with the highest probability of being selected by a user. The search engine can identify search results associated with the identified query suggestion and start a timer associated with the search results.

The search engine determines if a prediction criterion is met (610). The prediction criterion is independent of a user selection of a query suggestion provided in response to one or more query suggestion requests. For example, the prediction criterion is a probability threshold, a timer expiration, or a combination of the probability threshold and timer expiration. If the search engine determines that the probability associated with the identified query suggestion is above a threshold probability, the prediction criterion is met. If the search engine determines that a timer associated with one of the search results has expired (e.g., one of the search results associated with one of the query suggestion requests), the prediction criterion is met. The timer can be associated with the search results for the most recent query suggestion request or search results from a query suggestion request received before the most recent query suggestion request.

If the prediction criterion is met, the search engine provides search results to the client device (612). The search results are responsive to one of the query suggestions provided in response to the query suggestion request or one or more previous query suggestion requests. For example, the search engine provides the search results associated with the identified query suggestion to the client if the probability criterion is met. The search engine can provide the search results associated with a timer if the timer expired. If the search engine receives another query suggestion request from the client device, the process 600 continues for the next query suggestion request (608).

If the prediction criterion is not met, the search engine does not provide search results to the client device (612). For example, if the search engine determines that the prediction criterion is not met, the search engine does not provide search results to the client device. If the search engine receives another query suggestion request, the process 600 continues for the next query suggestion request (608). While the search engine does not receive another query suggestion request, the process 600 continues to check whether a prediction criterion is met (610). In some implementations, the process 600 stops if the search engine determines that a prediction criterion cannot be met until another query suggestion request is received from the client device.

The order of steps in the process 600 described above is illustrative only, and processing of query suggestion requests can be done in different orders. For example, while the process 600 above describes providing query suggestions responsive to the query suggestion request, and then determining if a prediction criterion is met, the process 600 can be modified so that the process 600 determines if a prediction criterion is met and then provides query suggestions to the client, either with or without the search results.

In some implementations, the process 600 can include additional steps or some of the steps of the process 600 can be divided into multiple steps, as described above with reference to FIGS. 2-5E. For example, the process 600 can adjust a timer associated with search results when the search engine identifies the same search results as being responsive to two consecutive query suggestion requests. The process 600 can include shortening or extending the duration of the timer. In one example, the process 600 can include increasing a probability percent associated with a query suggestion that is responsive to two consecutive query suggestion requests. In one example, the process 600 can include adjusting the prediction criteria based on the resources available to the search engine.

Although described as being implemented in a server, portions of the process 600 can be performed in the client device. For example, the client device can determine if prediction criteria are met, and request corresponding search results from the search engine when the prediction criteria are met. The search engine, in turn, provides the search results and client device renders the search results as described above. Alternatively, the search results can be provided with each set of query suggestions, and when a prediction criterion is met, the client device renders the search results that are stored in the browser cache.

Figure 7:
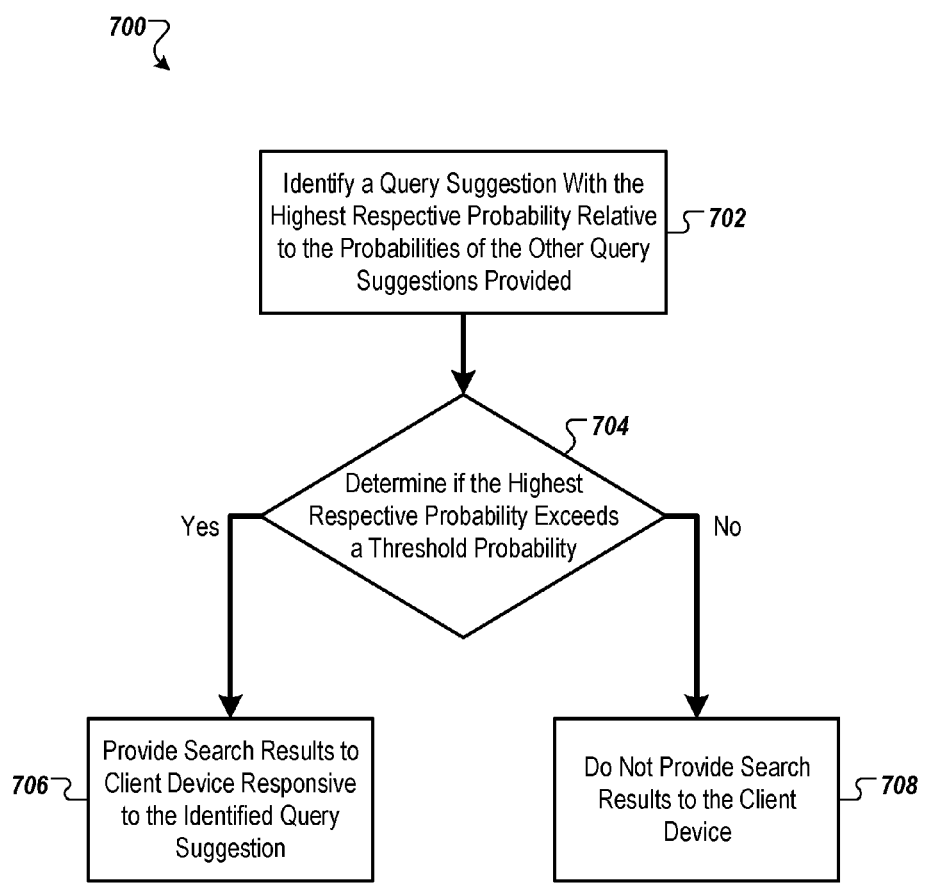
FIG. 7 is a flow diagram of a process for determining if a prediction criterion is met.

FIG. 7 is a flow diagram of a process 700 for determining if a prediction criterion is met. The process 700 can be used by the search engine 110 to provide search results to the client device 106 or by the search service 404 to provide search results to the client 402. The process 700 can be performed as a part of the process 600 or as a separate process. For example, a search service performing the process 600 can perform the process 700 instead of steps 612-616.

The search engine identifies a query suggestion with the highest respective probability relative to the probabilities of the other query suggestions provided (702). For example, each query suggestion has a respective probability of being selected by a user. In some implementations, the search engine receives a query suggestion request from a client device and identifies query suggestions responsive to the request. The search engine can identify the query suggestion with the highest respective probability and identify search results responsive to the identified query suggestion.

The search engine determines if the highest respective probability exceeds a threshold probability (704). The threshold probability is greater than zero. For example, the search engine has a predetermined threshold probability. The search engine compares the highest respective probability with the threshold probability to determine if the highest respective probability exceeds the threshold probability. In some implementations, the search engine has more than one threshold probability and the search engine determines the current serving delay criteria associated with the client that will be provided with the query suggestions, as described above.

If the probably exceeds the threshold, the search engine provides search results to a client device responsive to the identified query suggestion (706). The search results provided are responsive to the query suggestion with the highest respective probability. For example, if the highest respective probability exceeds the threshold probability, the search engine provides the search results associated with the identified query suggestion to the client. In some implementations, the search engine provides the query suggestions, including the identified query suggestion and the other query suggestions, to the client device with the search results.

Conversely, if the probably doe not exceed the threshold, the search engine does not provide search results to a client device (708).

In some implementations, the search engine receives another query suggestion request and the process 700 continues to identify a query suggestion with the highest probability for the query suggestions responsive to the received query suggestion request (702).

§5.0 Example Client Query Process Flows

Figure 8:
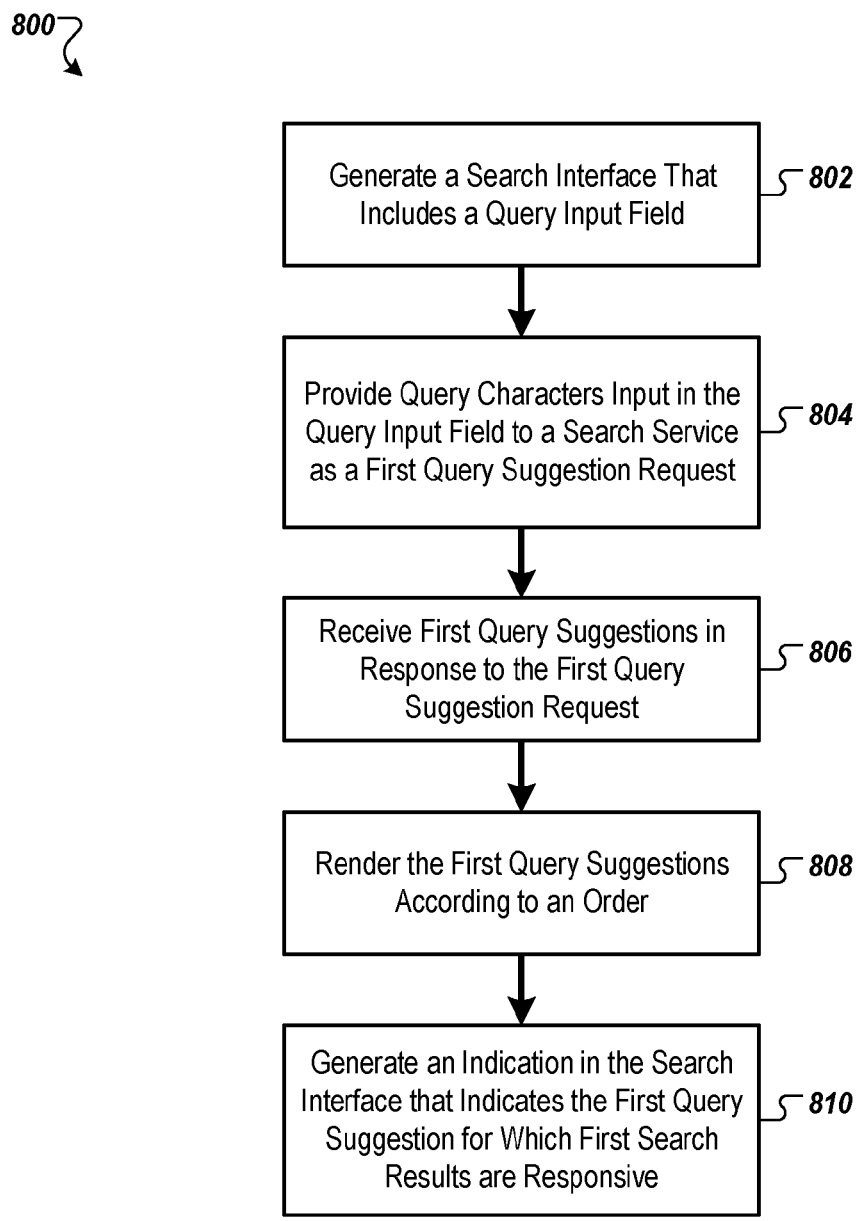
FIG. 8 is a flow diagram of a process for indicating a query suggestion for which search results are responsive.

FIG. 8 is a flow diagram of a process 800 for indicating a query suggestion for which search results are responsive. The process 800 can be used by the client to receive query suggestions from the search engine.

The client generates a search interface that includes a query input field (802). For example, the client receives HTML, and scripts from the search service and generates a web search page. The web search page includes a query input field for receiving character input from a user.

The client provides query characters input in the query input field to a search service as a first query suggestion request (804). For example, the client receives query characters in the query input field from a user. The client sends the first query suggestion request to the search service in response to receiving the query characters. The client can send a query suggestion request for every character, every n characters, or every word entered into the query input field.

The client receives first query suggestions in response to the first query suggestion request (806). For example, the client receives the first query suggestions from the search service in response to the first query suggestion request.

The client renders the first query suggestions according to an order (808). For example, the first query suggestions can include a ranking order. The client can present the first query suggestions in the search interface according to the ranking order. The client can render the first query suggestions below the query input field. In some implementations, the client can render the first query suggestions to the left or the right of the query input field.

The client generates an indication in the search interface that indicates the first query suggestion for which first search results are responsive (810). The generation of the indication is performed in response to the client receiving the first search results responsive to one of the first query suggestions. The first search results are received independent of user selection of one of the query suggestions and independent of sending a completed query to the search service. For example, the first search results are received independent from the user selecting one of the first query suggestions, selecting a search or a send button, or pressing enter. The indication can be presentation of differentiated text in the query input field after the query character input. The differentiated text and the query character input can form the word or words for which the first search results are responsive. In other implementations, the indication can be highlighting the first query suggestion in a query suggestion box.

In some implementations, the process 800 can include additional steps or some of the steps of the process 800 can be divided into multiple steps, as described above with reference to FIGS. 2-5E.

Figure 9:
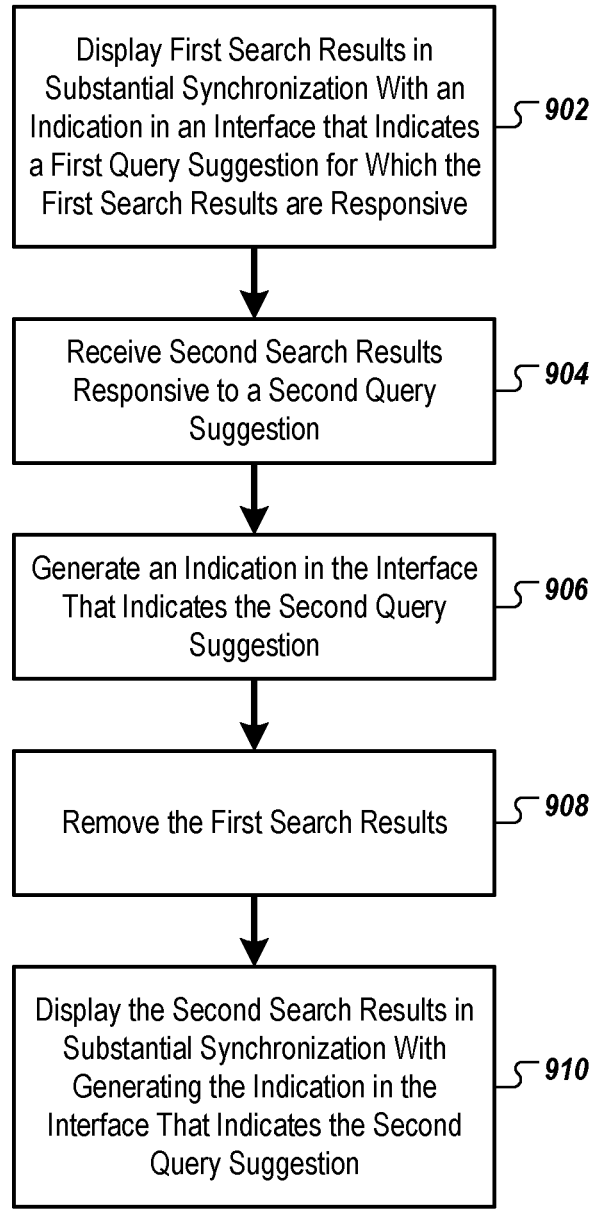
FIG. 9 is a flow diagram of a process for displaying second search results responsive to a second query suggestion.

FIG. 9 is a flow diagram of a process 900 for displaying second search results responsive to a second query suggestion. The process 900 can be used by the client to receive query suggestions from the search service. In some implementations, the client can perform the process 900 after performing the process 800.

The client displays first search results in substantial synchronization with an indication in an interface that indicates a first query suggestion for which the first search results are responsive (902). For example, the client presents the first search results in a search interface at the same time that the differentiated text is presented in the query input field. In one example, the client presents the indication of the first query suggestion and after a delay of one second or less presents the first search results.

The client receives second search results responsive to a second query suggestion (904). The second query search results are received subsequent in time to the first query suggestion for which the first search results are displayed. For example, the client may have provided a second query suggestion request, received the query suggestions, and prediction criterion for the second query suggestion is met.

The client generates an indication in the interface that indicates the second query suggestion (906). For example, the client can present differentiated text in a query input field or highlight the second query suggestion in a query suggestion box.

The client removes the first search results (908). For example, the client fades out the first search results, removing the first search results from the search interface.

The client displays the second search results in substantial synchronization with generating the indication in the interface that indicates the second query suggestion (910). For example, the client displays the second search results one second after presentation of the differentiated text or highlighting of the second query suggestion. In some implementations, the second search results fade in on the search interface while the first search results fade out from the search interface.

The order of steps in the process 900 described above is illustrative only, and processing of query suggestion requests can be done in different orders. For example, while the process 900 above describes removing the first search results, then displaying the second search results, the process 900 can be modified so that the first search results are removed at the same time that the second search results are displayed.

In some implementations, the process 900 can include additional steps or some of the steps of the process 900 can be divided into multiple steps, as described above with reference to FIGS. 2-5E.

§6.0 Advertisement Bidding and Management

In some implementations, when a query suggestion is selected, keywords related to the query suggestions are also selected, and advertisement targeted to the keywords are provided with the search results in response to a predication criterion being met. However, in these implementations, when the query input is a query stem, the query stem presents, at most, an ambiguous signal of the user's interest. For example, the query stem "p" is the first letter of many different words and queries that cover many different subjects and interests.

Thus, in some implementations, the advertisement management system 130 stores campaign data 132 that indicates whether an advertiser desires to target advertisements with search results that are provided in response to a prediction criterion being met. The advertisement management system 130 allows advertisers to "opt out" of targeting in these situations.

Should the advertiser decide to opt-in to targeting advertisements with search results that are provided in response to a prediction criterion being met, the advertiser can select several targeting options. The first targeting option targets advertisements based on keywords associated with query suggestions that are selected for providing search results in response to a prediction criterion being met. The first targeting option selects advertisements in a manner similar to the way advertisements are selected for queries that are explicitly entered by the user (e.g., when the user enters a query and selects a search command to submit the query to the search engine 110). Each time an advertisement is provided, an impression can be counted for the advertisement. Alternatively, as described in section 7 below, impressions may only be counted in the presence of the signal that a user has stopped typing and is viewing the search results and/or advertisements.

The second targeting option targets advertisements based on query stems. This targeting option is especially useful for advertisers that are attempting to meet one or more advertising objectives through the use of display advertisements. A display advertisement is an advertisement that is not necessarily directed to driving traffic to a particular landing page, but instead is directed to some other advertising goal, such as building brand recognition. Query stem targeting, however, can also be used for other advertising objectives as well, including driving traffic to particular landing page.

Figure 10:
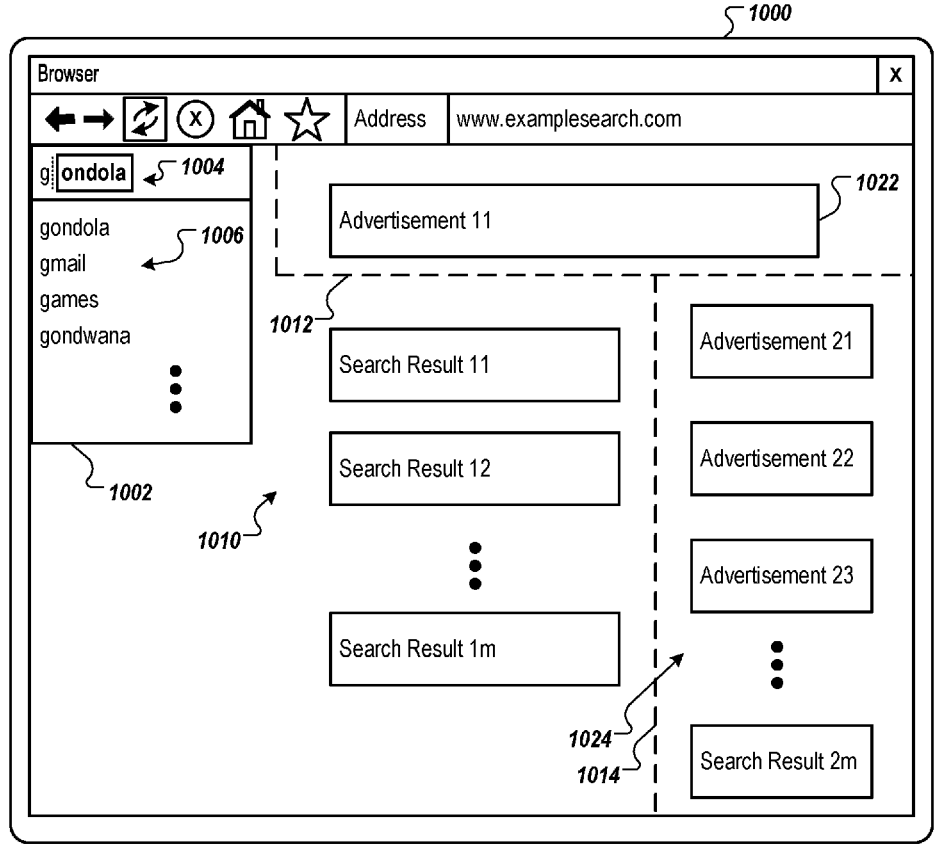
FIG. 10 depicts a web search page displaying query suggestions for a query stem, search results responsive to one of the query suggestions, and advertisements responsive to the query stem.

FIG. 10 depicts a web search page 1000 displaying query suggestions 1006 for a query stem (e.g., the letter "g"), search results 1010 responsive to one of the query suggestions (e.g., query suggestion 1004), and advertisements 1022 and 1024 responsive to the query stem. Search results 1010 are responsive to the query suggestion 1004 (i.e., the query "gondola"), and are selected and shown as described above.

The advertisements are responsive to the query stem "g." In particular, the advertisers have submitted send bids for word stems. Each word stem is one or more characters ordered in a sequence and to which one or more characters can be attached to the end of the sequence to form a word. For example, the letter "g" is a word stem for gondola, Gmail, games, and Gondwana, and other words. Although a query stem of only one letter shown in FIG. 10, query stems can also include two or more letters, e.g., a, aa, ab, etc.

The advertisers can review the query stems by use of the user interface, and provide stem bids for query stems that they desire to bid upon. Each stem bid is a bid for a corresponding word stem and corresponding to a price an advertiser pays for display of an advertisement targeted to the corresponding word stem. Example pricing schemes are described with respect to FIG. 11 below.

Typically, the targeting of a corresponding word stem foreign advertisement is independent of keyword targeting. In other words, a bid for an advertisement is submitted when a query stem is received, and the query stem need not correspond to a key word on which the advertiser has bid.

The advertisement management system 130, in response to receiving the query stem, identifies word stems that match the query stem, and provide corresponding stem bids of the matching word stems as bids to an advertisement auction for advertisement slots for displaying advertisements. For example, in FIG. 10, there are m advertisement slots available in the area 1014, and there is one advertisement slot available in the area 1012. Separate auctions can be conducted for both areas, or, alternatively, a single auction can be conducted for the slots in both areas.

Once the auctioning is complete, the advertisement management system 130 receives elected advertisements that are determined to have won an advertisement slot in the auction, and provides the selected advertisements for display in the advertisement slots on the client device.

The advertisement management system 130 can implement processes to reduce the number of auction operations. For example, it may not be practical to run an auction for each character that is input for query stem and which results in a request for query suggestions. For example, the user may type very quickly when inputting a complete query, and thus it would be inefficient to conduct advertisement auctions for each query input.

Thus, in some implementations, the advertisement management system 130 receives the query stem only in response to the search engine 110 (or the advertisement management system 130) determining that a prediction criterion is met. Accordingly, in these implementations, an advertisement auction is only run when search results are provided in response to a prediction criterion being met. In other implementations, the advertisement management system 130 provides the selected advertisements only in response to the search engine (or the advertisement management system 130) determining that a prediction criterion is met.

Although the advertisements shown in FIG. 10 are described as having been provided in response to an auction based on stem bids, advertisements can also be provided in response to an auction based on keywords associated with a selected query suggestion. For example, some of the advertisements 1024 may have been selected based on stem bids for the query stem "g", and some of the advertisements may been selected based on keyword bids associated with keywords for the query suggestion "gondola."

In some implementations, advertisers can manually select query stems and input bids for each query stem. For example, the advertisement management system 130 can provide a user interface that shows the most frequent query stems that occur, and frequency measures indicating the relative frequency of occurrence of each query stem. An advertiser can select various query stems and provide bids for each one.

In other implementations, the query stems and, optionally, stem bids for the query stems can be determined automatically from the keywords that an advertiser is currently bidding upon. For example, the advertisement management system can receive keywords on which an advertiser has bid. For each keyword, the advertisement management system 130 selects one or more characters that form a stem of the keywords and that do not include all of the characters of the keywords. For example, assume an advertiser has bid on the keyword "aardvark." The advertisement management system 130 can select the query stems "a", "aa", and "aar."

There are a variety of ways of the advertisement management system 130 can determine which query stems to select from the particular keyword. In some implementations, the advertisement management system selects up to a maximum n-gram length of query stems. For example, if the advertiser management system 130 is configured to select up to quad-grams for query stems, then for the keyword aardvark, the query stems a, aa, aar, and aard are selected.

In some implementations, the advertisement management system can also take into account the frequency the query stems. For example, query stems that occur below a threshold frequency can be precluded from automatic selection. Returning to the aardvark example, assume that the query stems "aar" and "aard" only occurred a frequency that is below the threshold frequency. Accordingly, the advertisement management system 130 does not select these to query stems for automatic bidding. The advertiser may, however, manually select these query stems.

To determine the stem bids for the automatically selected query stems, the advertisement management system identifies a keyword bid for the keyword from which the stem was derived, and determines the stem bid based on the identified keyword bid. In some implementations, the stem bid is proportional to the keyword bid. For example, a stem bid can be a percentage of a corresponding keyword bid, e.g., 10%. In other implementations, the stem bids can all be set to an initial fixed price, and the advertiser can manually adjust the prices.

In some implementations, the advertiser is charged an amount that is based on the stem bid when the advertisement is shown with the search results. However, a user may frequently receive search results but may not otherwise view the search results review the advertisements are provided with the search results. For example, the user may be a slow typist. Thus, an advertiser may not want to pay an auction cost for every occurrence of an advertisement being shown with the search results, as there may be many times that a user does not view the advertisements.

Accordingly, in some implementations, the advertisement management system 130 defines stem bids according to a cost per unit time of display. Using stem bids that are cost per unit time of display, the advertisement management system 130 can charge advertisers based on the amount of time that their advertisements were displayed.

In some implementations, the advertisement management system 130 receives data defining a duration that the selected advertisements were displayed in the advertisement slots on the client device after advertisements are provided to the client device. The duration can be determined by instructions on the client device that are provided with the search resource, e.g., a timer that starts when the advertisements are rendered, and stops when new advertisements are received or when the search results are removed from display. Alternatively, the duration can be determined by the search engine 110 or the advertisement management system 130 based on the time differential between previous advertisements being sent and a set of current advertisements being sent. Other ways determining the duration can also be implemented. For each selected advertisement that was displayed, the advertisement management system 130 determines an amount proportional to the stem bid of the selected advertisement and the duration, and charges each advertiser of a selected advertisement the amount for the selected advertisement.

Figure 11:
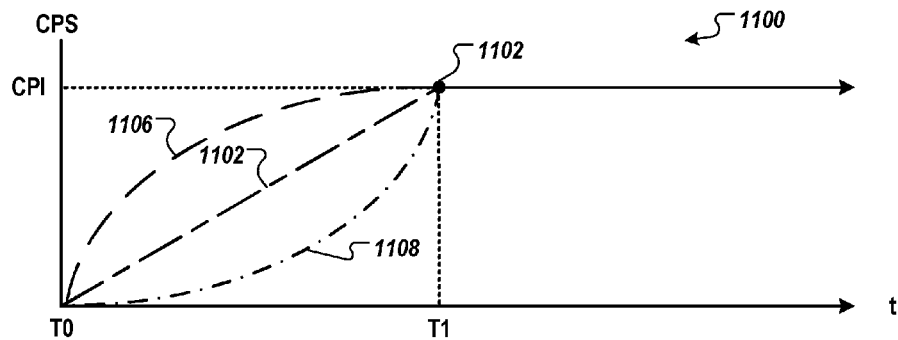
FIG. 11 is a graph of illustrating an amount based on a relationship between a stem bid and a display duration.

FIG. 11 is a graph 1100 of illustrating an amount based on a relationship between a stem bid and a display duration. The horizontal axis represents time, and the vertical axis represents a cost incurred per unit time, e.g., the cost per second. For example, assume time T0 is the time at which an advertisement is rendered on the client device. At time T0, no cost is incurred. As time continues, because can increase according to a function defined relationship between the stem bid in unit time. A variety of functions can be used. For example, the function can be a first-degree polynomial function defining a relationship between the stem bid and unit time, as indicated by the line 1104. Alternatively, the function can be an n-degree polynomial function defining a relationship between the stem bid and unit time, with n being greater than 1, as indicated by the curves 1106 and 1108. Other functions can also be used, e.g., a sigmoid function defining a relationship between the stem bid and unit time.

In some implementations, the advertisement management system 130 can define a minimum display duration. This minimum duration is greater than 0 seconds, and if an advertisement is displayed only for less than the minimum duration, then no charges are incurred. For example, assume the time T0 is 100 ms, indicating that the advertisement has been displayed for at least 100 ms. After 100 ms, charges are incurred, as indicated by the amounts corresponding to the function lines 1104, 1106 and 1108.

In some implementations, the advertisement management system 130 can find a maximum display duration. The maximum display duration is the time after which no additional charges are incurred for display the advertisement. For example, assume T1 represents the maximum display duration, e.g., 5 seconds. As long as and advertisements displayed for a time less than the maximum display duration, the amount charged to the advertiser continues to increase and tell the maximum display duration is reached. Thereafter, the amount is a maximum amount that does not increase further. For example, the maximum amount CPI is reached at the time T1. In some implementations, this maximum amount may correspond to an amount that an advertiser is typically charged for an impression. Other maximum amounts can also be used.

In some implementations, the advertisements that are provided with search results persist in the display even after the corresponding search results are removed. In these implementations, advertisements are provided for a query stem can persist until the occurrence of another prediction criterion being met. For example, assume that the user continues to provide query inputs into the input field of the user interface shown in FIG. 10, typing the query stem "gar". The search results 1010 may disappear, is there no longer relevant to the current query input; however, the advertisements may persist until the occurrence of another prediction event. In the event that advertisements have been provided for both query stems and keywords, e.g., some of the advertisement shown in FIG. 10 were provided for the query stem g, while other advertisements were provided for keywords associated with the word "gondola," the advertisements based on the keywords may disappear with the search results, but the advertisements associated with the query stem "g" may persist. This behavior can be implemented in instructions that are provided with the search engine resource.

Figure 12:
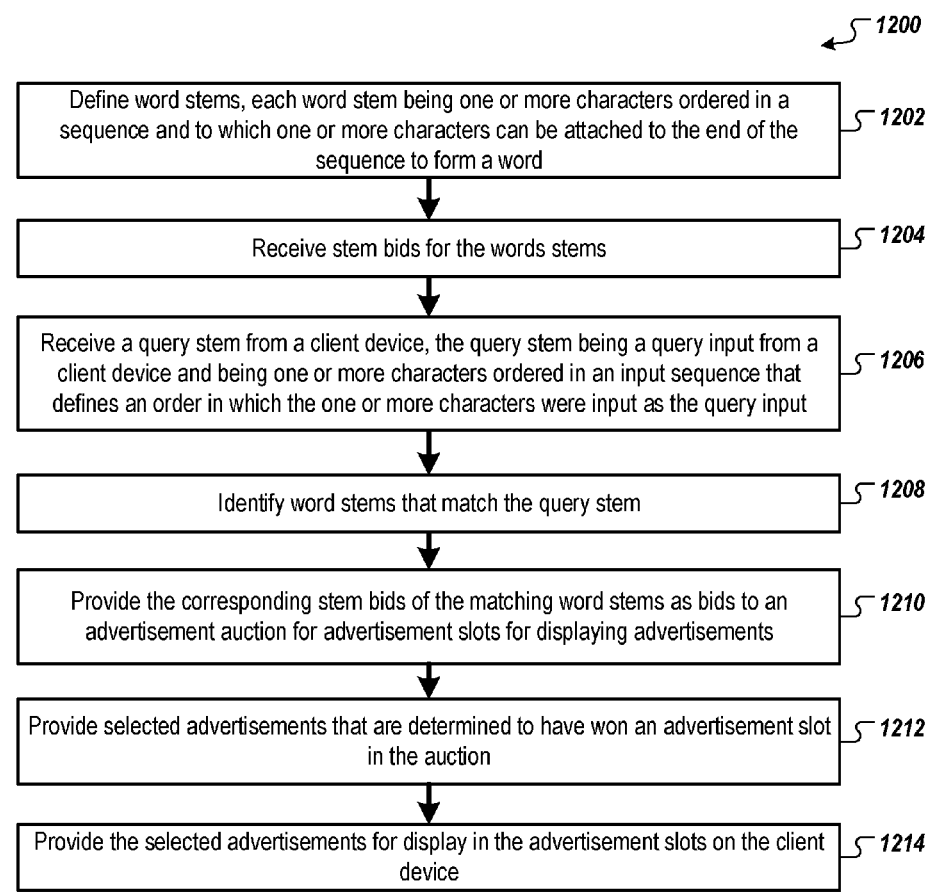
FIG. 12 is a flow diagram of a process for selecting advertisements responsive to a query stem.

FIG. 12 is a flow diagram of a process 1200 for selecting advertisements responsive to a query stem. The process 1200 can be implemented in the advertisement management system 130.

The process 1200 defines word stems (1202). For example, the advertisement management system defines word stems, each of which are were more characters ordered in the sequence into which one or more characters can be attached to the end of the sequence to former word.

The process 1200 receive stem bids for the word stems (1204). For example, the advertisement management system receive stem bids from advertisers.

The process 1200 receives a query stem from a client device (1206). For example, the advertisement management system receives a query stem is a query input of one or more characters ordered in an input sequence that defines the order in which the one or more characters were input as the query input.

The process 1200 identifies word stems that match the query stem (1208). For example, the advertisement management system 130 identifies only word stems that exactly match the query stem received. In some implementations, the advertisement management system can also identify word stems for which the query stem constitutes a stem for the word stem. For example, if the query stem "a" is received, the word stems "a", "aa," and "ab" can be determined to match the word stem.

The process 1200 provides a corresponding stem bids of the matching word stems is bids to an advertisement auction for advertisement slots for displaying advertisements (1210). For example, the advertisement management system 130 can access the campaign data 132 to retrieve the stem bids from advertisers that have been on the matching word stems.

The process 1200 provides selected advertisements that are determined to be have one an advertisement slots in the auction (1212). For example, the advertisement management system 130 selects advertisements for which he stem bids resulted in the highest auction scores.

The process 1200 provides the selected advertisements for display in the advertisement slots on the client device (1214). For example, the advertisement management system transmits the advertisements to the client device, and the client device, in response to receiving the advertisements, renders them with the search results.

§7.0 Search Result Selections and Impression Attribution

As described above, the search engine 110 stores historical data in the form of click logs and query logs. The search engine 110 can also store historical data indicating when search results resulted in a user interaction. For example, if search results are provided and displayed in response to a prediction criterion, and then no additional query suggestion requests or search commands are received, the search engine 110 interprets this as a signal that the results satisfy the user's information needs to some degree. Accordingly, a "valid prediction count" for each of the search results shown can updated. The prediction count for each search result can be compared to its overall "prediction count", i.e., the number of times the search result was provided in response to a prediction criterion being met, to determine a valid prediction rate. As different search results are provided for different suggestions, over time, highly relevant search results will emerge as having high valid prediction rates. Accordingly, the valid prediction rates can be used as a quality signal that is indicative of the quality of the underlying resources referenced by the search results.

In a variation of this implementation, a valid prediction count for a search result is only counted if there is a specific interaction with the search result. For example, a valid prediction count is only counted when a "mouse over" or selection of a search result is recorded.

In another implementation, the search engine 110 determines which resources referenced by search results are often selected from query suggestions that stem from the current query input. In response to the prediction criteria being met, the resources with the highest resource metric (e.g., the top N resources that are most often selected, or the top N resources as ranked by a function of their selections, their importance in a resource graph, and, optionally, other metrics) are provided as search results for the query input. The resource metrics of the resources are aggregated in such a manner that selections of the resources can result in search results referencing resources that would otherwise be responsive to different query suggestions that stem from the current query input.

Figure 13:
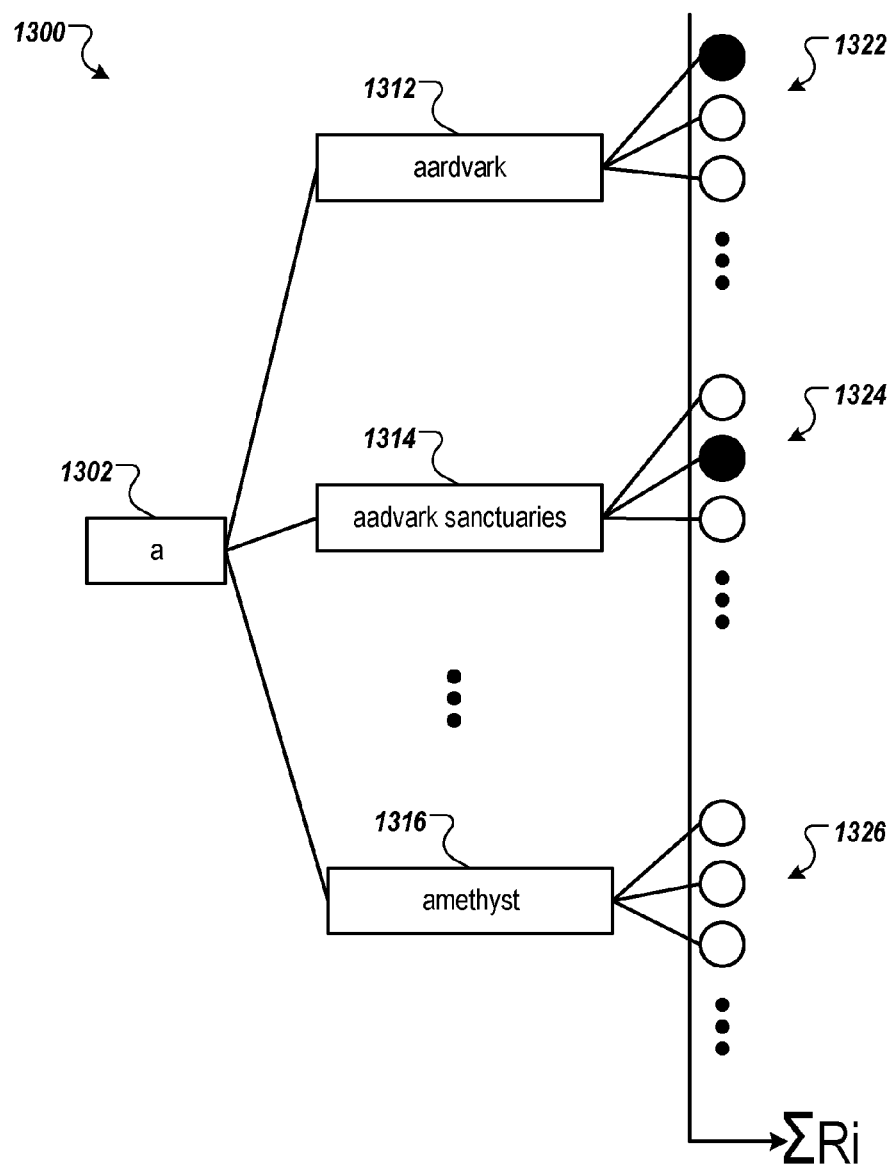
FIG. 13 is a block diagram illustrating the selection of resources for a query input in response to a prediction criteria being met and based on resource metrics.

The selections are illustrated in FIG. 13, which is a block diagram 1300 illustrating the selection of resources for a query input 1302 in response to a prediction criteria being met and based on resource metrics R. For the query input "a", query suggestions for which the query input is a stem are selected. For example, as shown in FIG. 13, the set of query suggestions 1312-1316 are selected. In some implementations, all query suggestions that stem from the query input 1302 are selected. In other implementations, a subset of all query suggestions that stem from the query input 1302 are selected. The subset can be based on, for example, the query suggestions that are most often selected by users, or query suggestions that most often result in user interactions (e.g., selections of search results), or query suggestions with the highest confidence measures and or quality measures.

From the selected query suggestions, the search system 110 identifies sets of resources that are referenced by search results responsive to the query suggestions. For example, the first set of resources 1322 are referenced by search results responsive to the query suggestion 1312; the second set of resources 1324 are referenced by search results responsive to the query suggestion 1314; and the final set of resources 1326 are referenced by search results responsive to the query suggestion 1316. The sets of resources are not exclusive sets, i.e., a particular resource can be included in two sets, as indicated by the first resource in the set 1322 the second resource in the set 1324 be shaded to indicate they are the same resource.

The search system 110 then aggregates a quality metric R for each of the referenced resources in each set of resources. A variety of quality metrics can be used. For example, the metric can be a count of the number of times a particular resource was selected from the search results belonging to the sets 1322-1326; or can be a selection rate that is a ratio of the number of times particular resource was selected from the search results belonging to the sets 1322-1326 to the number of times the search results were presented; or can be a value based on the a function of selections, importance in a resource graph, and, optionally, other metrics.

The search engine 110 identifies the resources with the highest resource metric, and, in response to a prediction criteria being met, provides search results referencing these resources in response to the query input 1302. For example, search results referencing the top N resources, as ranked by their respective resource metrics, can be provided for the query input 1302. Alternatively, a subset of the search results provided can reference the top one or two resources as determined by the resource metric R, and the remaining search results provided can be for a top ranked query suggestion.

Similar processes can be used for advertisements that are provided with search results. For example, if no additional query suggestion requests follow the display of the search results, and no additional search commands are received, then an impression for each advertisement that is shown with the search results is counted.

With both attribution models above, if there is a user interaction responsive to the search results or an advertisement (e.g., a selection of a search result or an advertisement), corresponding impressions and the click-through are recorded.

In some implementations, when the client updates the search results presented in the search interface 502 after receiving new search results, the advertisements remain if they are still determined to be relevant to the query suggestion for which the search results are provided. For example, the search engine 110 may be in data communication with the advertisement management system 130. For each query suggestion and search result set, the search system/advertisement management system determines whether the advertisements that were previously provided are relevant to the search results current being provided. If so, the advertisements that are relevant remain displayed. The advertisements that are not relevant can be removed, and the available advertisement slots that result can be separately auctioned for new, relevant advertisements.

§8.0 Additional Implementation Details

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer-readable medium, such as a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system, comprising:
a data processing apparatus; and
a non-transitory computer storage medium encoded with a computer program, the program comprising data processing apparatus instructions that when executed by the data processing apparatus cause the data processing apparatus to perform operations comprising:
receiving query suggestion requests from a client device, each query suggestion request having been generated in response to a partial query input in a query input field of a search resource presented at the client device;
in response to each query suggestion request:
providing, to the client device, query suggestions responsive to the request;
determining, for each query suggestion provided to the client device a quality measure for the query suggestion, the determining comprising:
determining, for the query suggestion, a value indicating quality of resources referenced by search results responsive to the query suggestion, wherein a quality of each resource is determined by a valid prediction rate that is based on a ratio of number of times a search result referencing the resource was selected when provided in response to the query suggestion to a number of times a search result referencing the resource was provided in response to the query suggestion;
determining if a prediction criterion is met, the prediction criterion being independent of a user selection of a query suggestion provided to the client device in response to one or more query suggestion requests and independent of receiving a completed query from the client device;
in response to determining that the prediction criterion is met, providing search results to the client device, each of the search results identifying a particular resource that satisfies a query, and includes a resource locator for the resource, comprising:
determining whether a query suggestion has a quality measure that meets a threshold;
in response to determining that a query suggestion provided to the client device has a quality measure that meets the threshold, providing, to the client device, search results for the query suggestion having the quality measure that meets the threshold, the search results being responsive to the query suggestion; and
in response to determining that none of the query suggestions provided to the client device have a quality measure that meets the threshold, providing, to the client device, search results for only the partial query, the search results being responsive to the partial query; and
in response to determining that the prediction criterion is not met, not providing the search results to the client device.

2. The system of claim 1, wherein a quality of each resource is further determined by a ranking of the resource in an authority graph.

3. The system of claim 1, wherein a quality of each resource is further determined by a search score that measures a responsiveness of the resource to the query suggestion.

4. A method performed by a data processing apparatus, comprising:
receiving query suggestion requests from a client device, each query suggestion request having been generated in response to a partial query input in a query input field of a search resource presented at the client device;
in response to each query suggestion request:
providing, to the client device, query suggestions responsive to the request;
determining, for each query suggestion provided to the client device, a quality measure for the query suggestion;
determining if a prediction criterion is met, the prediction criterion being independent of a user selection of a query suggestion provided to the client device in response to one or more query suggestion requests and independent of receiving a completed query from the client device;
in response to determining that the prediction criterion is met, providing search results to the client device, each of the search results identifying a particular resource that satisfies a query, and includes a resource locator for the resource, comprising:
determining whether a query suggestion has a quality measure that meets a threshold, the determining comprising:
determining, for the query suggestion, a value indicating quality of resources referenced by search results responsive to the query suggestion, wherein a quality of each resource is determined by a valid prediction rate that is based on a ratio of number of times a search result referencing the resource was selected when provided in response to the query suggestion to a number of times a search result referencing the resource was provided in response to the query suggestion;
in response to determining that a query suggestion provided to the client device has a quality measure that meets the threshold, providing, to the client device, search results for the query suggestion having the quality measure that meets the threshold, the search results being responsive to the query suggestion; and
in response to determining that none of the query suggestions provided to the client device have a quality measure that meets the threshold, providing, to the client device, search results for only the partial query, the search results being responsive to the partial query;
in response to determining that the prediction criterion is not met, not providing the search results to the client device.

5. The method of claim 4, wherein a quality of each resource is further determined by a ranking of the resource in an authority graph.

6. The method of claim 4, wherein a quality of each resource is further by a search score that measures a responsiveness of the resource to the query suggestion.

7. Software stored on a non-transitory computer memory device and comprising instructions executable by a data processing apparatus and upon such execution cause the data processing apparatus to perform operations comprising:
receiving query suggestion requests from a client device, each query suggestion request having been generated in response to a partial query input in a query input field of a search resource presented at the client device;
in response to each query suggestion request:
providing, to the client device, query suggestions responsive to the request;
determining, for each query suggestion provided to the client device a quality measure for the query suggestion, the determining comprising:
determining, for the query suggestion, a value indicating quality of resources referenced by search results responsive to the query suggestion, wherein a quality of each resource is determined by a valid prediction rate that is based on a ratio of number of times a search result referencing the resource was selected when provided in response to the query suggestion to a number of times a search result referencing the resource was provided in response to the query suggestion;
determining if a prediction criterion is met, the prediction criterion being independent of a user selection of a query suggestion provided in response to one or more query suggestion requests and independent of receiving a completed query from the client device;
in response to determining that the prediction criterion is met, providing search results to the client device, each of the search results identifying a particular resource that satisfies a query, and includes a resource locator for the resource, comprising:
determining whether a query suggestion has a quality measure that meets a threshold;
in response to determining that a query suggestion provided to the client device has a quality measure that meets the threshold, providing, to the client device, search results for the query suggestion having the quality measure that meets the threshold, the search results being responsive to the query suggestion; and
in response to determining that none of the query suggestions provided to the client device have a quality measure that meets the threshold, providing, to the client device, search results for only the partial query, the search results being responsive to the partial query;
in response to determining that the prediction criterion is not met, not providing the search results to the client device.

* * * * *